US012141837B2

(12) United States Patent
Chakrabarti

(10) Patent No.: US 12,141,837 B2
(45) Date of Patent: Nov. 12, 2024

(54) METHODS AND APPARATUS TO EXTRACT INFORMATION FROM UNIFORM RESOURCE LOCATORS

(71) Applicant: The Nielsen Company (US), LLC, New York, NY (US)

(72) Inventor: Muktamala Chakrabarti, Grantham (GB)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/882,380

(22) Filed: Aug. 5, 2022

(65) Prior Publication Data

US 2023/0045424 A1   Feb. 9, 2023

Related U.S. Application Data

(60) Provisional application No. 63/230,324, filed on Aug. 6, 2021.

(51) Int. Cl.
*G06Q 30/0251* (2023.01)
*G06F 16/955* (2019.01)

(52) U.S. Cl.
CPC ..... *G06Q 30/0256* (2013.01); *G06F 16/9566* (2019.01); *G06Q 30/0271* (2013.01)

(58) Field of Classification Search
CPC ............ G06Q 30/0256; G06Q 30/0271; G06F 16/9566
See application file for complete search history.

(56) References Cited

U.S. PATENT DOCUMENTS

| 6,110,637 | A | 8/2000 | Sezi et al. | |
| 8,370,489 | B2 | 2/2013 | Mazumdar et al. | |
| 2014/0149204 | A1* | 5/2014 | Schler | G06Q 30/0242 705/14.41 |
| 2015/0254714 | A1* | 9/2015 | Zhuang | G06F 16/951 705/14.54 |
| 2015/0371269 | A1* | 12/2015 | Seth | G06Q 30/0261 705/14.58 |

(Continued)

FOREIGN PATENT DOCUMENTS

WO   WO-2018051096 A1 *  8/2013  ........... G06F 16/213

OTHER PUBLICATIONS

H. Li, G. Ye, X. Liu, F. Zhao, D. Wu and X. Lin, "URLSight: Profiling Mobile Users via Large-Scale Internet Metadata Analytics," 2016 IEEE Trustcom/BigDataSE/ISPA, Tianjin, China, 2016, pp. 1728-1733, doi: 10.1109/TrustCom.2016.0265. (Year: 2016).*

(Continued)

*Primary Examiner* — Marie P Brady

(57) ABSTRACT

Methods, apparatus, systems, and articles of manufacture are disclosed to extract information from uniform resource locators (URLs). An example system includes at least one memory, programmable circuitry, and instructions to cause the programmable circuitry to collect first uniform resource locator (URL) information from a server of an Internet-based media publisher, the first URL information corresponding to first media accessed by first users, determine first URL components in the first URL information, and determine feature-to-user assignment rules based on the first URL components.

18 Claims, 11 Drawing Sheets

(56) References Cited

U.S. PATENT DOCUMENTS

2017/0148066 A1* 5/2017 Heffernan ........... H04L 43/0876
2022/0300636 A1* 9/2022 Benton ............... G06F 16/9535

OTHER PUBLICATIONS

Greenberg, Jane. "Metadata and the world wide web." Encyclopedia of library and information science 3 (2003): 1876-1888. (Year: 2003).*

A. Saste, M. Bedekar and P. Kosamkar, "Predicting demographic attributes from web usage: Purpose and methodologies," 2017 International Conference on I-SMAC (IoT in Social, Mobile, Analytics and Cloud) (I-SMAC), Palladam, India, 2017, pp. 381-386, doi: 10.1109/I-SMAC.2017.8058376. (Year: 2017).*

* cited by examiner

METHODS AND APPARATUS TO EXTRACT INFORMATION FROM UNIFORM RESOURCE LOCATORS

RELATED APPLICATION

This patent arises from a patent application that claims the benefit of U.S. Provisional Patent Application No. 63/230,324, which was filed on Aug. 6, 2021. U.S. Provisional Patent Application No. 63/230,324 is hereby incorporated herein by reference in its entirety. Priority to U.S. Provisional Patent Application No. 63/230,324 is hereby claimed.

FIELD OF THE DISCLOSURE

This disclosure relates generally to computer-based audience measurement and, more particularly, to methods and apparatus to extract information from uniform resource locators.

BACKGROUND

In recent years, entities such as advertisers have utilized targeted advertising to direct Internet-based advertisements to consumers with specific characteristics. Such targeted advertising can increase the effectiveness of advertisements by preventing advertisements from being presented to consumers that are not likely to purchase the advertised product.

BRIEF DESCRIPTION OF THE DRAWINGS

In general, the same reference numbers will be used throughout the drawing(s) and accompanying written description to refer to the same or like parts. The figures are not to scale.

Figure 1:
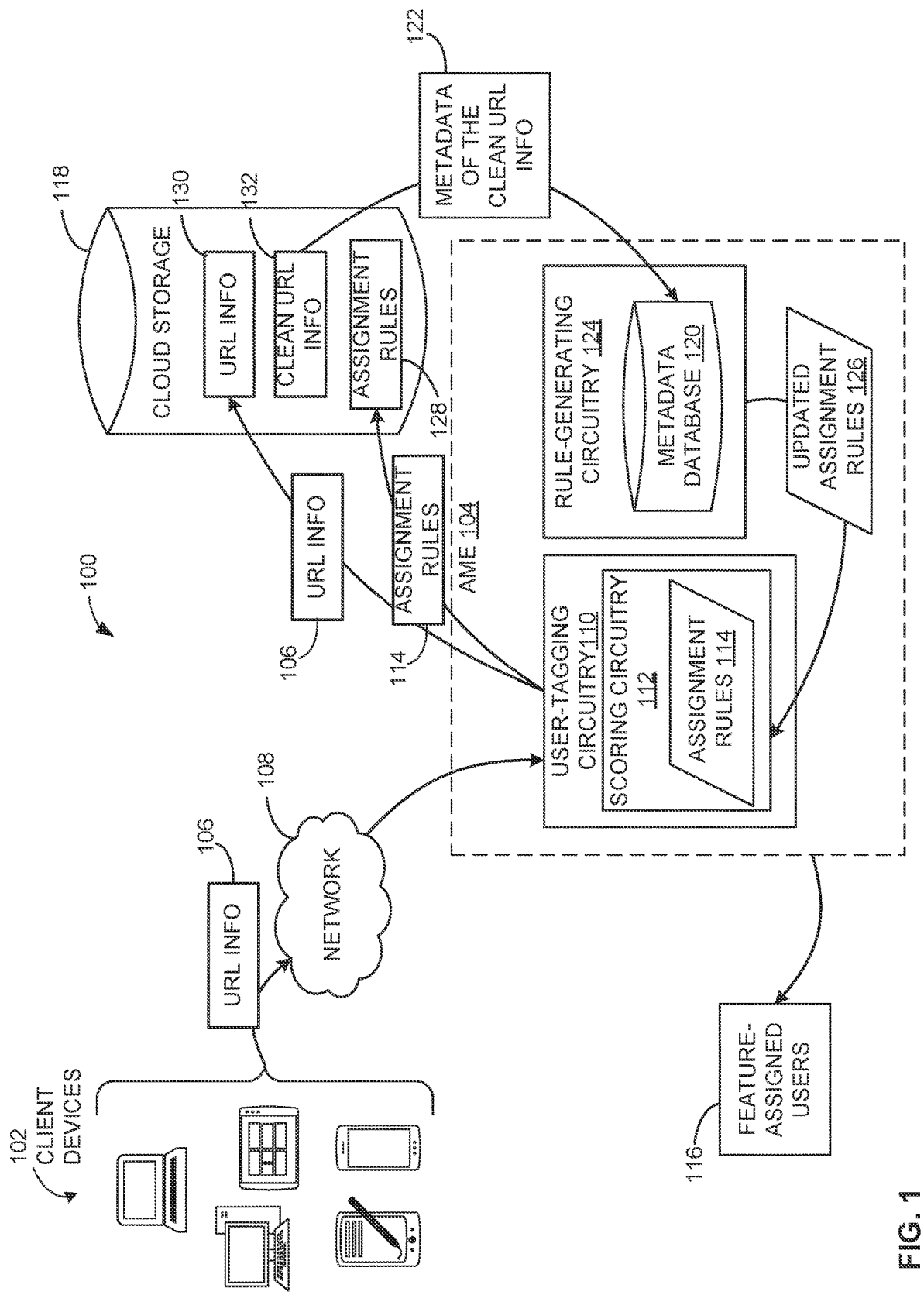
FIG. 1 is an example system for logging uniform resource locator (URL) data of website accesses via client devices and assigning features to users based on the URL data.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify to dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein, "substantially real time" and "substantially real-time" refer to an occurrence in a near instantaneous manner recognizing there may be real-world delays for computing time, transmission, etc. Thus, unless otherwise specified, "substantially real time" and "substantially real-time" refer to being within a 1-second time frame of real time.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

DETAILED DESCRIPTION

Determining a size and demographics of an audience of a media presentation helps media providers and distributers schedule programming and determine a price for advertising presented during the programming. In addition, accurate estimates of audience demographics enable advertisers to target advertisements to certain types and sizes of audiences. To collect these demographics, an audience measurement entity may enlist a group of media consumers (e.g., a panel of panelists) to cooperate in an audience measurement study. In some examples, the audience measurement entity obtains (e.g., directly, or indirectly from a media service provider) return path data from media presentation devices (e.g., set-top boxes) that identifies tuning data from the media presentation devices. In such examples, because the return path data may not be associated with known panelists, the audience measurement entity models and/or assigns audience members as corresponding to the return path data. In some examples, the media consumption habits and demographic data associated with the enlisted panelists are collected and used to statistically determine the size and demographics of the entire audience of the media presentation. In some examples, this collected data (e.g., data collected via measurement devices) may be supplemented with survey information, for example, recorded manually by audience members.

Techniques for monitoring user access to an Internet-accessible media, such as advertisements and/or content, via digital television, desktop computers, mobile devices, etc., have evolved significantly over the years. Internet-accessible media is also known as digital media. In the past, such monitoring was done primarily through server logs. In particular, entities serving media on the Internet would log the number of requests received for their media at their servers. Basing Internet usage research on server logs is problematic for several reasons. For example, server logs can be tampered with either directly or via zombie programs, which repeatedly request media from the server to increase the server log counts. Also, media is sometimes retrieved once, cached locally and then repeatedly accessed from the local cache without involving the server. Server logs cannot track such repeat views of cached media. Thus, server logs are susceptible to both over-counting and under-counting errors.

The inventions disclosed in Blumenau, U.S. Pat. No. 6,108,637, which is hereby incorporated herein by reference in its entirety, fundamentally changed the way Internet monitoring is performed and overcame the limitations of the server-side log monitoring techniques described above. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from the client to a content provider site. The monitoring information is indicative of the manner in which content was displayed In some implementations, an impression request or ping request can be used to send or transmit monitoring information by a client device using a network communication in the form of a hypertext transfer protocol (HTTP) request. In this manner, the impression request or ping request reports the occurrence of a media impression at the client device. For example, the impression request or ping request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests or ping requests cause monitoring data reflecting information about an access to the media to be sent from the client device that downloaded the media to a monitoring entity and can provide a cookie to identify the client device and/or a user of the client device. In some examples, the monitoring entity is an audience measurement entity (AME) that did not provide the media to the client and who is a trusted (e.g., neutral) third party for providing accurate usage statistics (e.g., The Nielsen Company, LLC). Since the AME is a third party relative to the entity serving the media to the client device, the cookie sent to the AME in the impression request to report the occurrence of the media impression at the client device is a third-party cookie. Third-party cookie tracking is used by measurement entities to track accesses to media accessed by client devices from first-party media servers.

There are many database proprietors operating on the Internet. These database proprietors provide services to large numbers of subscribers. In exchange for the provision of services, the subscribers register with the database proprietors. Examples of such database proprietors include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These database proprietors set cookies and/or other device/user identifiers on the client devices of their subscribers to enable the database proprietors to recognize their subscribers when they visit their web sites.

The protocols of the Internet make cookies inaccessible outside of the domain (e.g., Internet domain, domain name, etc.) on which they were set. Thus, a cookie set in, for example, the facebook.com domain (e.g., a first party) is accessible to servers in the facebook.com domain, but not to servers outside that domain. Therefore, although an AME (e.g., a third party) might find it advantageous to access the cookies set by the database proprietors, they are unable to do so.

The inventions disclosed in Mazumdar et al., U.S. Pat. No. 8,370,489, which is incorporated by reference herein in its entirety, enable an AME to leverage the existing databases of database proprietors to collect more extensive Internet usage by extending the impression request process to encompass partnered database proprietors and by using such partners as interim data collectors. The inventions disclosed in Mazumdar accomplish this task by structuring the AME to respond to impression requests from clients (who may not be a member of an audience measurement panel and, thus, may be unknown to the AME) by redirecting the clients from the AME to a database proprietor, such as a social network site partnered with the AME, using an impression response. Such a redirection initiates a communication session between the client accessing the tagged media and the database proprietor. For example, the impression response received at the client device from the AME may cause the client device to send a second impression request to the database proprietor. In response to the database proprietor receiving this impression request from the client device, the database proprietor (e.g., Facebook) can access any cookie it has set on the client to thereby identify the client based on the internal records of the database proprietor. In the event the client device corresponds to a subscriber of the database proprietor, the database proprietor logs/records a database proprietor demographic impression in association with the user/client device.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or advertisement campaign) has been accessed by a web population (e.g., the number of times the media is accessed). In some examples, an impression or media impression is logged by an impression collection entity (e.g., an AME or a database proprietor) in response to an impression request from a user/client device that requested the media. For example, an impression request is a message or communication (e.g., an HTTP request) sent by a client device to an impression collection server to report the occurrence of a media impression at the client device. In some examples, a media impression is not associated with demographics. In non-Internet media delivery, such as television (TV) media, a television or a device attached to the television (e.g., a set-top-box or other media monitoring device) may monitor media being output by the television. The monitoring generates a log of impressions associated with the media displayed on the television. The television and/or connected device may transmit impression logs to the impression collection entity to log the media impressions.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporarily available online after broadcast, TV media, etc.). For example, a user may start watching the Walking Dead television program on a television as part of TV media, pause the program, and continue to watch the program on a tablet as part of DTV media. In such an example, the exposure to the program may be logged by an AME twice, once for an impression log associated with the television exposure, and once for the impression request generated by a tag (e.g., census measurement science (CMS) tag) executed on the tablet. Multiple logged impressions associated with the same program and/or same user are defined as duplicate impressions. Duplicate impressions are problematic in determining total reach estimates because one exposure via two or more cross-platform devices may be counted as two or more unique audience members. As used herein, reach is a measure indicative of the demographic coverage achieved by media (e.g., demographic group(s) and/or demographic population(s) exposed to the media). For example, media reaching a broader demographic base will have a larger reach than media that reached a more limited demographic base. The reach metric may be measured by tracking impressions for known users (e.g., panelists or non-panelists) for which an audience measurement entity stores demographic information or can obtain demographic information. Deduplication is a process that is necessary to adjust cross-platform media exposure totals by reducing (e.g., eliminating) the double counting of individual audience members that were exposed to media via more than one platform and/or are represented in more than one database of media impressions used to determine the reach of the media.

As used herein, a unique audience is based on audience members distinguishable from one another. That is, a particular audience member exposed to particular media is measured as a single unique audience member regardless of how many times that audience member is exposed to that particular media or the particular platform(s) through which the audience member is exposed to the media. If that particular audience member is exposed multiple times to the same media, the multiple exposures for the particular audience member to the same media is counted as only a single unique audience member. In this manner, impression performance for particular media is not disproportionately represented when a small subset of one or more audience members is exposed to the same media a significantly large number of times while a larger number of audience members is exposed fewer times or not at all to that same media. By tracking exposures to unique audience members, a unique audience measure may be used to determine a reach measure to identify how many unique audience members are reached by media. In some examples, increasing unique audience and, thus, reach, is useful for advertisers wishing to reach a larger audience base.

Notably, although third-party cookies are useful for third-party measurement entities in many of the above-described techniques to track media accesses and to leverage demographic information from database proprietors, use of third-party cookies may be limited or may cease in some or all online markets. That is, with fewer or no opportunities to use third-party browser cookies and monitoring instructions in media (e.g., monitoring instructions embedded in media as pixel tags), examples disclosed herein mitigate reliance on database proprietor data to measure the demographic distributions of an audience and utilize panel data. However, due to its low sample size, not all media can be covered by the panel data.

Examples disclosed herein may be used to combine seed data with a user's behavioral data to build look-a-like models. In examples disclosed herein, example user behavioral data includes Internet access activities such as browsing behavior, online social interaction behavior, times of online activity, etc. In examples disclosed herein, the user's behavioral data is obtained from the user's browsing behavior through monitoring uniform resource locators (URLs) of websites that the user visits. Examples disclosed herein assign (e.g., tag) a user with one or more features based on the user's browsing behavior. As used herein, a look-a-like model is a model based on a set of users (e.g., seed data) known to have a common interest. Look-a-like models can be used to identify additional users who may share the common interest. Identifying the additional users that may share the target interest allows an entity (e.g., an AME) to target media (e.g., advertisements, etc.) to the additional users, potentially increasing the relevancy of the audience of the media or increasing a reach of the media. In some examples, the common interest is determined based on survey data. An example of such a survey is a VisualDNA survey (by The Nielsen Company) which is a personality quiz where users are shown questions about their interests, hobbies, and personality traits along with images. Based on the user's chosen answers (e.g., images) to the questions and by analyzing the user's online behavior, the AME can generate a substantially detailed and accurate personality profile. The AME builds look-a-like models to scale up those audiences for targeted advertising. In look-a-like models, survey responders are used as seed data along with their features gathered from online browsing through URL information monitoring to build look-a-like models to find other users with similar online behavior.

In examples disclosed herein, features for at least a portion of a set of users in a given look-a-like model are gathered through monitoring of URL information and assigning (e.g., tagging) the users with the features. The features of the users of the look-a-like model can be used to find other users with similar features (e.g., behavioral data) to predict whether the other users will have the same interest(s) as represented in the look-a-like model. As used herein, URL information is information that can be monitored and collected by an AME relating to online browsing behavior of a user including, but not limited to, a URL of a website and a device ID associated with the browsing.

The effectiveness of using look-a-like models to predict user interests depends on how well the AME is able to capture information from the URLs that are used in the look-a-like-models as independent variables or features. In examples disclosed herein, independent variables or features are behavior characteristics (e.g., interest in a product) assigned to a user based on survey data and/or browsing behavior and used to predict dependent (e.g., unknown) features (e.g., interest in a second product). In some examples, the independent variables or features used in a look-a-like model can also be used to infer audience demographics that have similar browsing behavior as AME panelists.

As described above, features are assigned to a user based on collected URL information corresponding to a user's browsing behavior. In some examples, a fixed set of rules is used to assign features to users based on URL information. Examples disclosed herein dynamically generate a list of rules for assigning users with features based on URL information. For example, the list of rules for assigning users with features based on URL information is updated periodically or aperiodically based on gathered URL information. Such dynamic generation of the list of rules for assigning users with features enables modification of the rules in a large scale to maintain or improve a relevancy of the rules over time. Using the dynamic rule generation disclosed herein can result in improved feature extraction and tagging as well as improved look-a-like models. Additionally, examples disclosed herein include a process of extracting features from URLs that can improve the quality of the look-a-like models.

Due to increasing public security on privacy and data tracking, support for third-party cookies is expected to phase out by many companies that provide services via the Internet. Support for third-party cookies allows for an AME to combine data from multiple publishers to build a combined user feature dataset for use in building look-a-like models. As used herein, a publisher is an Internet-based media publisher such as a webpage provider, a streaming media provider, etc. As used herein, a user feature dataset is a dataset including user identifiers (e.g., user IDs, device IDs, any other user identifier, etc.) with assigned (e.g., tagged) features. In a user feature dataset, each user identifier may be assigned with one or more features. As the support for third-party cookies decreases, the AME may alternatively utilize publisher-specific data (e.g., user data, feature data, etc.) to build publisher-specific models. However, publisher-specific data may be limited (e.g., limited quantity, limited quality, limited data type, limited availability) and result in smaller user feature datasets compared to the combined user feature datasets from multiple publishers. Therefore, the AME is limited in its ability to build models as the user feature datasets become limited with a limited number of users and a limited number of features. In the example of having limited user data in the user feature dataset, data density (e.g., number of features-per-user) may be less than what is needed to build more accurate and useful look-a-like models.

In building more accurate and useful look-a-like models, an AME utilizes user feature datasets based on higher feature densities (e.g., more types of features) or users with more features. In addition to quantity of features, relevant features that capture the browsing behavior properly are more useful for building more accurate and useful look-a-like models. The process of extracting features from URL information in examples disclosed herein is useful to improve the feature density of the user feature dataset and the relevancy of the features within the user feature dataset in order to make the look-a-like models more accurate and useful.

Examples disclosed herein provide a solution to technical challenges arising from URLs being unstructured data. Further, examples disclosed herein provide a solution to the technical challenge of the large volume of collected URL information to be processed. For example, the large volume of URL data causes a technical challenge in applying natural language processing techniques on URL data, because it is difficult or nearly impossible to collect and store such a volume of data on a local computer. Examples of large volumes of data include petabytes (e.g., 1000 Terabytes) of URL data. Therefore, examples disclosed herein solve the technical challenge presented by the large volume of URL data by storing the URL data in cloud storage and/or in a cloud computing server and mapping the metadata (e.g., file location, partition, etc.) of the URL data to a metastore (e.g., Apache Hive metastore) that facilitates processing of the large volume of URL data. For example, examples disclosed herein utilize a workflow management platform (e.g., Apache Airflow) to process the large volume of URL data mapped to the metastore. In examples disclosed herein, a set of rules is generated for assigning features to users based on the URL information collected from browsing activity of that user. Once the set of rules are created, the rules are loaded to a scoring engine that tags (e.g., assigns) users with a feature when the URL satisfies a rule associated with that feature. Examples disclosed herein include applying natural language processing techniques within big data architecture. In examples disclosed herein, the set of rules may be generated on a quarterly basis (or at any other suitable interval). For example, an algorithm may be run every three months to create a set of rules based on URL information received during the three preceding months. Examples disclosed herein improve an accuracy of audience metrics relative to methods that use a fixed set of rules. For example, examples disclosed herein provide for flexibility to change one or more URL rules and/or develop more relevant rules specific to a publisher or domain.

In examples disclosed herein, resources (e.g., computing resources) used by the scoring engine to assign features to users are proportionate to a number of rules. For example, for a large a number of rules for assigning features, the scoring engine uses a correspondingly large amount of computing resources to process URL information and assign features to users. Alternatively, for fewer rules for assigning features, the scoring engine uses fewer computing resources to process URL information and assign features to users. Examples disclosed herein balance performance of the scoring engine against the number of rules used by the scoring engine. For example, a set of rules may be updated based on recently collected URL information without adding any new rules. Therefore, the performance of the scoring engine in assigning users with features can be increased without increasing the computing resources needed by the scoring engine due to the number of rules not increasing. Examples disclosed herein keep the most relevant features, thus increasing the efficiency of the feature tagging process. In the example of publisher-specific models, examples disclosed herein resolve the issue of low-feature density, thus improving the feature density in the input data and enabling the AME to build more accurate and useful look-a-like models.

Examples disclosed herein can be implemented using the following example process. As users visit publisher websites, URL information (e.g., a URL, a device ID, a user ID, etc.) is collected by an AME server. Periodically or aperiodically, the URL information is transferred to a cloud computing server (e.g., an Amazon Web Services Simple Storage Service (AWS S3 server), a Microsoft Azure Cloud Service server, etc.). Periodically or aperiodically, the URL information in the cloud computing server is cleaned (e.g., removal of punctuation, special characters, numbers, extra spaces, etc.) and the metadata of the cleaned URL information is transferred from the cloud computing server and/or mapped to a metadata database. Periodically or aperiodically, a natural language processing (NLP) algorithm is executed on the clean URL information in the cloud storage and the metadata of the cleaned URL information in the metadata database. The example NLP algorithm generates a list of the most relevant words and host URLs included in the cleaned URL information. The relevance can be based on a frequency of a word and/or host URL and/or a frequency of users or devices that use a word and/or host URL. For example, the most importance can be assigned to words and host URLs coming from a greater number of user IDs. Examples disclosed herein retrieve the list of the most relevant words and host URLs for each publisher. Additionally or alternatively, examples disclosed herein periodically or aperiodically generate a list of the most frequency bigrams (e.g., sequence of two words) and/or trigrams (e.g., sequence of three words) from the list of stored URLs. The relevant words, bigrams, and trigrams can be used to generate scoring rules that are then stored in a scoring engine of the AME for use in tagging users with features. The URL data, the clean URL data, and the scoring rules are stored and/or located in separate buckets within the cloud storage and/or within the cloud computing server. For example, the raw URL data is stored in a first bucket in the cloud storage and/or cloud computing server, the cleaned URL data is stored in a second bucket in the cloud storage and/or cloud computing server, and the scoring rules are stored in a third bucket in the cloud storage and/or cloud computing server. The data (e.g., raw URL data, the clean URL data, and the scoring rules) is not transferred to any on-premise database (e.g., local computer, local computing device, etc.).

FIG. 1 is an example operating environment 100 for logging URL information 106 of websites accessed via client devices 102. The example operating environment 100 includes the example client devices 102, an example audience measurement entity (AME) 104, an example network 108, and example cloud storage 118.

In the example of FIG. 1, the client devices 102 may be stationary or portable computers, handheld computing devices, smart phones, Internet appliances, and/or any other type of device that may be connected to the Internet. The example client devices 102 can access webpages via the Internet. Some webpages include instructions or a script that cause a web browser to report monitoring information to the AME 104. Such webpages may be referred to as participating webpages. When a participating webpage is accessed by the client devices 102 via the Internet, the client devices 102 send URL information 106 associated with the webpage access to the AME 104 via the network 108. In some examples, the URL information 106 includes one or more URLs of the accessed webpage, a publisher ID of the webpage, a group ID of the website, a user ID associated with the client device 102, and/or a device ID associated with the client device 102.

In the example of FIG. 1, the AME 104 is implemented by a cloud computing server. For example, the AME 104 is a server owned and/or operated by a cloud computing provider. In such examples, the AME 104 is geographically remote with respect to client devices 102. In additional or alternative examples, the AME 104 may be implemented by microprocessor circuitry executing instructions to implement one or more virtual machines and/or containers. For example, the AME 104 may be a containerized application including one or more containers that are in communication with one another. In some examples, the AME 104 is implemented by hardware circuitry such as an ASIC and/or an FPGA.

In the example of FIG. 1, the AME 104 includes example user-tagging circuitry 110 and example rule-generating circuitry 124. For example, the user-tagging circuitry 110 may be a first container executing within the cloud computing server (e.g., AME 104) and the rule-generating circuitry 124 may be a second container executing within the cloud computing server. As used herein, a container is microservice that performs a specific task and/or service. Additionally and/or alternatively, the user-tagging circuitry 110 may be implemented by a first cloud computing server that is in communication with the AME 104 and the rule-generating circuitry 124 may be implemented by a second cloud computing server that is in communication with the AME 104.

In the example of FIG. 1, the user-tagging circuitry 110 includes scoring circuitry 112 including feature-to-user assignment rules 114. The feature-to-user assignment rules 114 include rules for tagging users with features based on the URL information 106. For example, if the URL included in the URL information 106 includes a certain word or set of words, the feature-to-user assignment rules 114 instruct the scoring circuitry 112 to assign (e.g., tag) a feature to the user associated with the URL information 106. As a result, the AME 104 generates feature-assigned users 116. The feature-assigned users 116 include users (e.g., user identifiers) with at least one assigned feature. In some examples, a user can be assigned with more than one feature. In some examples, additional known information about at least a portion of the feature-assigned users 116 (e.g., survey responses from at least a portion of the feature-assigned users 116) can be used to build models (e.g., look-a-like models). The models (e.g., the look-a-like models) can be used to identify additional users that may have similar interests based on those users' browsing behavior (e.g., the URL information 106). In some examples, the feature-to-user assignment rules 114 are a fixed set of rules (e.g., generated at an initial time). In other examples, the feature-to-user assignment rules 114 can be changed from time to time. The scoring circuitry 112 stores the feature-to-user assignment rules 114 in the example cloud storage 118. In some examples, the scoring circuitry 112 stores the feature-to-user assignment rules 114 in a first cloud storage bucket 128, implemented by the cloud storage 118.

Periodically or aperiodically, the AME 104 transmits the URL information 106 to cloud storage 118. In some examples, the URL information 106 is transmitted to the cloud storage 118 every 10 minutes. In some examples, the AME 104 stores the URL information 106 into a second cloud storage bucket 130, implemented by the cloud storage 118. In some examples, the second cloud storage bucket 130 including the URL information 106 is different from the first cloud storage bucket 128 including the feature-to-user assignment rules 114. The AME 104 includes rule-generating circuitry 124. The example rule-generating circuitry 124 includes a metadata database 120. Periodically or aperiodically, the rule-generating circuitry 124 retrieves the URL information 106 from the cloud storage 118. In some examples, the rule-generating circuitry 124 retrieves the URL information 106 on a daily basis (e.g., once every 24 hours). For example, the rule-generating circuitry 124 can clean the URL information 106 by removing extraneous information (e.g., punctuation, special characters, numbers, extra spaces, etc.). The rule-generating circuitry 124 can also split (e.g., parse) the URL information 106 to generate host URLs and metadata. The clean URLs can be stored in a partitioned structure (e.g., partitioned by date) to assist further processing of the URLs. In some examples, the rule-generating circuitry 124 processes the URL information 106 during retrieval of the URL information 106. The example metadata database 120 can then store the metadata of the clean URL information 122. In some examples, the clean URL information is stored as a table in cloud storage backed by the metadata stored in metadata database 120. In some examples, the metadata database 120 is implemented by a distributed fault-tolerant data warehouse system (e.g., a hive data warehouse). In some examples, such a distributed fault-tolerant data warehouse system uses batch processing and employs a distributed job scheduling framework and a distributed storage solution (e.g., Apache Hadoop storage architecture). In some examples, the rule-generating circuitry 124 stores the clean URL information into a third cloud storage bucket 132, implemented by the cloud storage 118. In some examples, the third cloud storage bucket 132 including the clean URL information is different from the first cloud storage bucket 128 including the feature-to-user assignment rules 114 and the second cloud storage bucket 130 including the URL information 106.

Periodically or aperiodically, the example rule-generating circuitry 124 can be executed on the clean URL information stored in the cloud storage 118 and metadata stored in the metadata database 120 to generate updated feature-to-user assignment rules 126. The updated feature-to-user assignment rules 126 can replace the feature-to-user assignment rules 114 of the scoring circuitry 112. As a result, the user-tagging circuitry 110 generates the feature-assigned users 116 based on the updated feature-to-user assignment rules 126.

Figure 2:
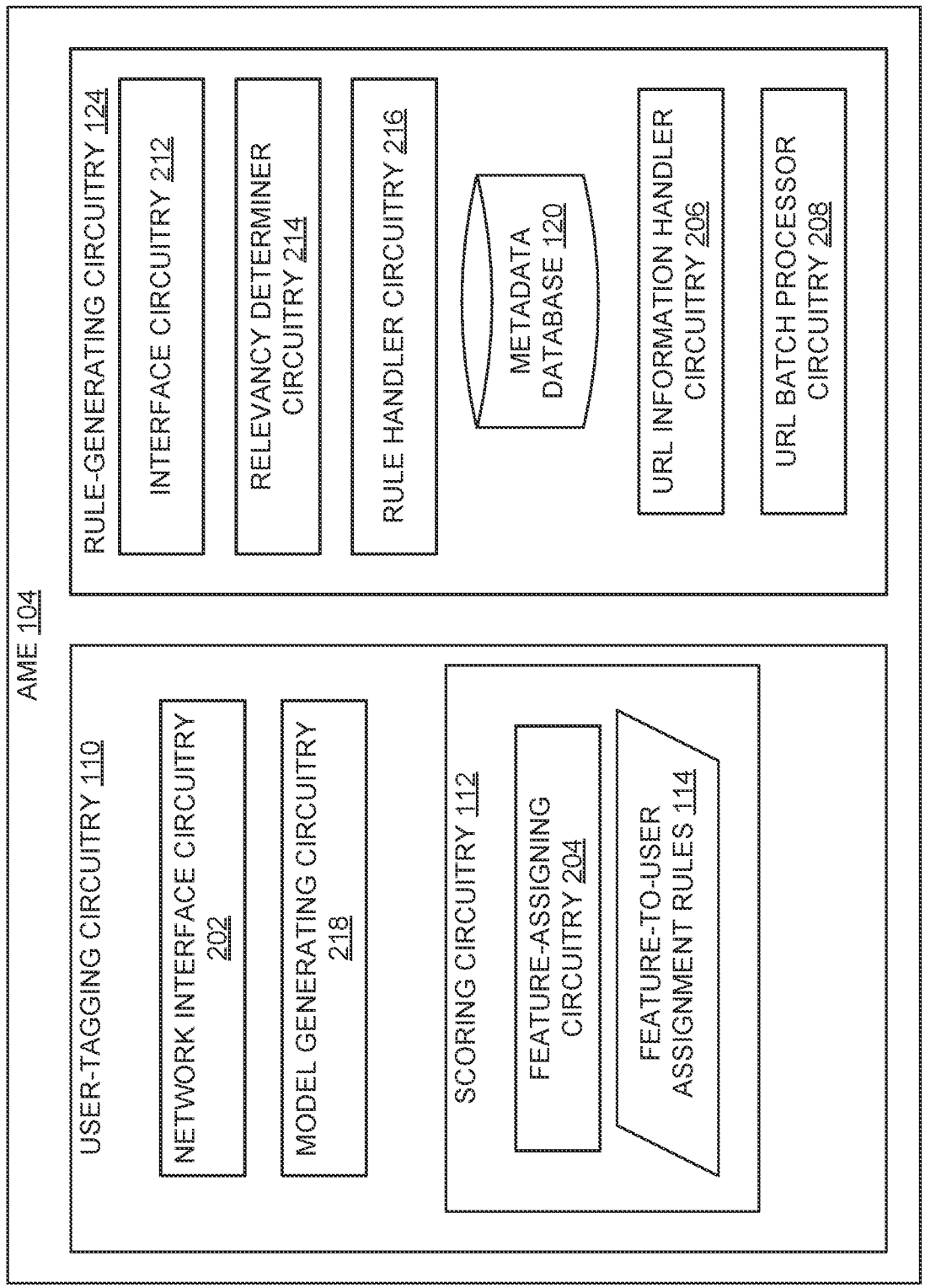
FIG. 2 is a block diagram of example user-tagging circuitry.

FIG. 2 is an example block diagram of the AME 104 of FIG. 1 to generate rules for assigning features to users and using the rules to assign features to users. The example AME 104 includes the user-tagging circuitry 110. As described above, the user-tagging circuitry 110 is a first container executing within the cloud computing server (e.g., AME 104). Additionally and/or alternatively, the user-tagging circuitry 110 may be implemented by a first cloud computing server that is in communication with the AME 104. Additionally and/or alternatively, the user-tagging circuitry 110 is instantiated by processor circuitry executing user-tagging instructions and/or configured to perform operations such as those represented by the flowchart of FIGS. 3-7. The example user-tagging circuitry 110 includes network interface circuitry 202. In some examples, the network interface circuitry 202 is instantiated by processor circuitry executing network interface instructions and/or configured to perform operations such as those represented by the flowchart of FIGS. 3-7. The example network interface circuitry 202 can retrieve URL information 106 (FIG. 1) from the client devices 102 (FIG. 1) via the network 108 (FIG. 1). For example, as the client devices 102 access a participating webpage via the Internet, instructions in the participating webpage cause the webpage to send monitoring information including the URL information 106 to the network interface circuitry 202. The example network interface circuitry 202 sends the URL information 106 to the cloud storage 118 (FIG. 1). For example, the network interface circuitry 202 aggregates the URL information 106 received over a given period of time (e.g., 24 hours) and loads the URL information 106 into the second cloud storage bucket 130, implemented by the cloud storage 118.

The example user-tagging circuitry 110 includes the scoring circuitry 112 including the feature-to-user assignment rules 114. The example scoring circuitry 112 assigns features to users based on incoming URL information 106. The example scoring circuitry 112 includes feature-assigning circuitry 204. In some examples, the feature-assigning circuitry 204 is instantiated by processor circuitry executing feature-assigning instructions and/or configured to perform operations such as those represented by the flowchart of FIGS. 3-7. The example feature-assigning circuitry 204 assigns (e.g., tags) features to users based on the URL information 106 and the feature-to-user assignment rules 114. For example, the feature-assigning circuitry 204 looks for matches of the components of the URL information 106 to rules included in the feature-to-user assignment rules 114. For example, if the URL information 106 includes a keyword "prince," and the feature-to-user assignment rules 114 include a rule based on the keyword "prince," the feature-assigning circuitry 204 tags (e.g., assigns) a user associated with that URL information 106 with the feature corresponding to that rule based on the keyword "prince." In some examples, the feature-assigning circuitry 204 performs such tagging or assigning by storing a user ID of the user in association with a feature ID of the feature. In other examples, the feature-assigning circuitry 204 stores a device ID corresponding to the analyzed URL information 106 associated with a feature ID of the feature. The example feature-assigning circuitry 204 can store the associations of the user IDs and/or device IDs with feature IDs as the feature-assigned users 116 (FIG. 1). Thus, as incoming URL information 106 is analyzed, the feature-assigned users 116 are updated.

The example rule-generating circuitry 124 includes the metadata database 120. The example metadata database 120 stores the metadata of the clean URL information 122. The example rule-generating circuitry 124 includes URL information handler circuitry 206. In some examples, the URL information handler circuitry 206 is instantiated by processor circuitry executing URL information handler instructions and/or configured to perform operations such as those represented by the flowchart of FIGS. 3-7. The example URL information handler circuitry 206 retrieves and organizes the URL information 106. For example, the URL information handler circuitry 206 can retrieve the URL information 106 from the cloud storage 118 (FIG. 1) once every 24 hours or at any other periodic or aperiodic interval. In some examples, the frequency at which the URL information handler circuitry 206 retrieves the URL information 106 from the cloud storage 118 is less than the frequency at which the network interface circuitry 202 transfers the URL information 106 to the cloud storage 118.

The example rule-generating circuitry 124 includes URL batch processor circuitry 208. In some examples, the URL batch processor circuitry 208 is instantiated by processor circuitry executing URL batch processing instructions and/or configured to perform operations such as those represented by the flowchart of FIGS. 3-7. The example URL batch processor circuitry 208 parses and cleans the URL information 106. For example, the URL batch processor circuitry 208 can parse URLs included in the URL information 106 retrieved from the cloud storage 118 by the URL information handler circuitry 206. As a result of the parsing, the URL batch processor circuitry 208 splits the URLs into host URLs and metadata, thus generating parsed URL information. The example URL batch processor circuitry 208 can also clean the parsed URL information. For example, the URL batch processor circuitry 208 can remove extraneous information (e.g., punctuation, special characters, numbers, extra spaces, etc.) from the parsed URL information. As a result of the cleaning, the URL batch processor circuitry 208 generates the clean URL information and, thus, the metadata of the clean URL information 122.

The example URL information handler circuitry 206 can organize the clean URL information stored in the third cloud storage bucket 132. For example, the URL information handler circuitry 206 organizes the clean URL information into a table or data structure including columns corresponding to URL, metadata, processed metadata, publisher, group ID, device ID, etc. The example URL information handler circuitry 206 stores the metadata of the clean URL information 122 in the metadata database 120. In some examples, the metadata of the clean URL information 122 is stored in the metadata database 120 as the table described above.

The example AME 104 includes the rule-generating circuitry 124. In some examples, the rule-generating circuitry 124 is instantiated by processor circuitry executing rule-generating instructions and/or configured to perform operations such as those represented by the flowchart of FIGS. 3-7. The example rule-generating circuitry can process the clean URL information stored in the cloud storage 118 and metadata stored in the metadata database 120 to generate updated feature-to-user assignment rules 126 (FIG. 1). The rule-generating circuitry 124 includes interface circuitry 212. In some examples, the interface circuitry 212 is instantiated by processor circuitry executing interface instructions and/or configured to perform operations such as those represented by the flowchart of FIGS. 3-7. The example interface circuitry 212 accesses the metadata of the clean URL information 122 from the metadata database 120 and the clean URL information from the cloud storage 118. For example, periodically (e.g., every three months) or aperiodically, the interface circuitry 212 can connect to the metadata database 120 and the cloud storage 118 and access the metadata of the clean URL information 122 and the clean URL information. The example interface circuitry 212 also can store the updated feature-to-user assignment rules 126 generated by the rule-generating circuitry in the cloud storage bucket 128 accessible by the scoring circuitry 112. For example, the interface circuitry 212 can replace the feature-to-user assignment rules 114 with the updated feature-to-user assignment rules 126.

The example rule-generating circuitry 124 includes relevancy determiner circuitry 214. In some examples, the relevancy determiner circuitry 214 is instantiated by processor circuitry executing relevancy determining instructions and/or configured to perform operations such as those represented by the flowchart of FIGS. 3-7. The example relevancy determiner circuitry 214 can determine relevant information from the clean URL information and the metadata of the clean URL information 122. For example, the relevancy determiner circuitry 214 can determine a list of relevant words, phrases, and/or host URLs from the clean URL information based on a frequency of the word, phrase, and/or host URL appearing in the URL information. For example, the relevancy determiner circuitry 214 may be implemented by a SQL query engine (e.g., Spark SQL, etc.) to perform natural language processing techniques. As used herein, a SQL query engine is circuitry utilized to run (e.g., execute) a module (e.g., a containerized application) that is used for structured data processing (e.g., processing data that has been organized into a formatted repository). In some examples, the relevancy determiner circuitry 214 is implemented by a distributed SQL query engine (e.g., a cloud-based SQL query engine). In some examples, the relevant keywords, key phrases, and host URLs are determined for each publisher. In some examples, the relevance is based on the device IDs (e.g., words and host URLs coming from a greater number of device IDs). In other words, the relevance can be determined not only based on the frequency of a word, phrase, or host URL but also based on a number of device IDs associated with the word or host URL. In some examples, the relevancy determiner circuitry 214 performs a first operation to determine relevant host URLs based on device IDs and a second operation to determine relevant keywords based on the metadata and the device IDs. In this example, the relevancy determiner circuitry 214 can combine the results of the first operation and the second operation to generate the list of relevant keywords and host URLs. The example relevancy determiner circuitry 214 can perform a third operation to determine a list of the most frequent key phrases (e.g., bigrams (i.e., sequence of two words) and/or trigrams (i.e., sequence of three words)) occurring in the URLs. The example relevancy determiner circuitry 214 can utilize natural language processing (NLP) for one or more of the first operation, the second operation and/or the third operation.

The example rule-generating circuitry 124 includes rule handler circuitry 216. In some examples, the rule handler circuitry 216 is instantiated by processor circuitry executing rule handler instructions and/or configured to perform operations such as those represented by the flowchart of FIGS. 3-7. The example rule handler circuitry 216 generates the updated feature-to-user assignment rules 126. For example, the rule handler circuitry 216 cleans the lists of relevant host URLs, relevant keywords, and/or relevant key phrases determined by the relevancy determiner circuitry 214. The example rule handler circuitry 216 can clean the lists by removing undesired or restricted words from the lists. For example, undesired or restricted words can include words not included in an English dictionary, stop words (e.g., words commonly avoided by search engines such as "the"), etc. The example rule handler circuitry 216 then can combine the cleaned lists of relevant keywords, relevant host URLs, and/or relevant key phrases to generate an initial rule list. For example, a rule in the initial rule list can indicate that if incoming URL information includes at least one of the relevant keywords, relevant host URLs, or relevant key phrases included in the rule list, the user associated with the URL information should be assigned with a feature corresponding to the relevant keyword, host URL, or key phrase identified in the rule list. In some examples, the combined, cleaned list generates more rules than desired for the scoring circuitry 112. For example, the scoring circuitry 112 can have a limit on a number of rules included in the feature-to-user assignment rules 114. The limit may be based on a processing requirement (e.g., resources, time, etc.) for the feature-assigning circuitry 204 where an excess number of rules results in unacceptable processing requirements. Therefore, the example rule handler circuitry 216 can select a subset of the rules from the combined, cleaned list to generate the updated feature-to-user assignment rules 126.

The example user-tagging circuitry 110 includes model generating circuitry 218. In some examples, the model generating circuitry 218 is instantiated by processor circuitry executing model generating instructions and/or configured to perform operations such as those represented by the flowchart of FIGS. 3-7. The example model generating circuitry 218 generates and/or updates one or more look-a-like models. For example, to generate and/or update one or more look-a-like models, the model generating circuitry 218 can use the feature-assigned users 116 as input to a regression model. In some examples, the model generating circuitry 218 generates and/or updates the look-a-like models periodically, aperiodically, or upon request. The one or more look-a-like models can be used to identify additional users with common interests in order to target media (e.g., advertisements, etc.) to the additional users.

In some examples, the apparatus includes means for collecting URL information. For example, the means for collecting URL information may be implemented by the network interface circuitry 202. In some examples, the network interface circuitry 202 may be instantiated by processor circuitry such as the example processor circuitry 812 of FIG. 8. For instance, the network interface circuitry 202 may be instantiated by the example microprocessor 900 of FIG. 9 executing machine executable instructions such as those implemented by at least blocks 302 of FIG. 3, 402, 404 of FIG. 4, 702 of FIG. 7. In some examples, the network interface circuitry 202 may be instantiated by hardware logic circuitry, which may be implemented by an ASIC, XPU, or the FPGA circuitry 1000 of FIG. 10 structured to perform operations corresponding to the machine readable instructions. Additionally or alternatively, the network interface circuitry 202 may be instantiated by any other combination of hardware, software, and/or firmware. For example, the network interface circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining URL components. For example, the means for determining URL components may be implemented by the rule-generating circuitry 124. In some examples, the rule-generating circuitry 124 may be instantiated by processor circuitry such as the example processor circuitry 812 of FIG. 8. For instance, the rule-generating circuitry 124 may be instantiated by the example microprocessor 900 of FIG. 9 executing machine executable instructions such as that implemented by at least blocks 304 of FIG. 3, 604, 606, 608 of FIG. 6. In some examples, the rule-generating circuitry 124 may be instantiated by hardware logic circuitry, which may be implemented by an ASIC, XPU, or the FPGA circuitry 1000 of FIG. 10 structured to perform operations corresponding to the machine readable instructions. Additionally or alternatively, the rule-generating circuitry 124 may be instantiated by any other combination of hardware, software, and/or firmware. For example, the rule-generating circuitry 124 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for determining feature-to-user assignment rules. For example, the means for determining feature-to-user assignment rules may be implemented by the rule-generating circuitry 124. In some examples, the rule-generating circuitry 124 may be instantiated by processor circuitry such as the example processor circuitry 812 of FIG. 8. For instance, the rule-generating circuitry 124 may be instantiated by the example microprocessor 900 of FIG. 9 executing machine executable instructions such as that implemented by at least blocks 306 of FIG. 3, 408 of FIG. 4, 610, 612, 614 of FIG. 6. In some examples, the rule-generating circuitry 124 may be instantiated by hardware logic circuitry, which may be implemented by an ASIC, XPU, or the FPGA circuitry 1000 of FIG. 10 structured to perform operations corresponding to the machine readable instructions. Additionally or alternatively, the rule-generating circuitry 124 may be instantiated by any other combination of hardware, software, and/or firmware. For example, the rule-generating circuitry 124 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for assigning features. For example, the means for assigning features may be implemented by the feature-assigning circuitry 204. In some examples, the feature-assigning circuitry 204 may be instantiated by processor circuitry such as the example processor circuitry 812 of FIG. 8. For instance, the feature-assigning circuitry 204 may be instantiated by the example microprocessor 900 of FIG. 9 executing machine executable instructions such as that implemented by at least blocks 706, 708 of FIG. 7. In some examples, the feature-assigning circuitry 204 may be instantiated by hardware logic circuitry, which may be implemented by an ASIC, XPU, or the FPGA circuitry 1000 of FIG. 10 structured to perform operations corresponding to the machine readable instructions. Additionally or alternatively, the feature-assigning circuitry 204 may be instantiated by any other combination of hardware, software, and/or firmware. For example, the feature-assigning circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the AME 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example user-tagging circuitry 110, the example network interface circuitry 202, the example scoring circuitry 112, the example feature-assigning circuitry 204, the example rule-generating circuitry 124, the example URL information handler circuitry 206, the example URL batch processor circuitry 208, the example interface circuitry 212, the example relevancy determiner circuitry 214, the example rule handler circuitry 216, the example model generating circuitry 218, and/or, more generally, the example AME 104 of FIG. 1, may be implemented by hardware alone or by hardware in combination with software and/or firmware. Thus, for example, any of the example user-tagging circuitry 110, the example network interface circuitry 202, the example scoring circuitry 112, the example feature-assigning circuitry 204, the example rule-generating circuitry 124, the example URL information handler circuitry 206, the example URL batch processor circuitry 208, the example interface circuitry 212, the example relevancy determiner circuitry 214, the example rule handler circuitry 216, the example model generating circuitry 218, and/or, more generally, the example AME 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example AME 104 of FIG. 1 may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the AME 104 of FIG. 2 are shown in FIGS. 3-7. The machine readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3-7, many other methods of implementing the example AME 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 3-7 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
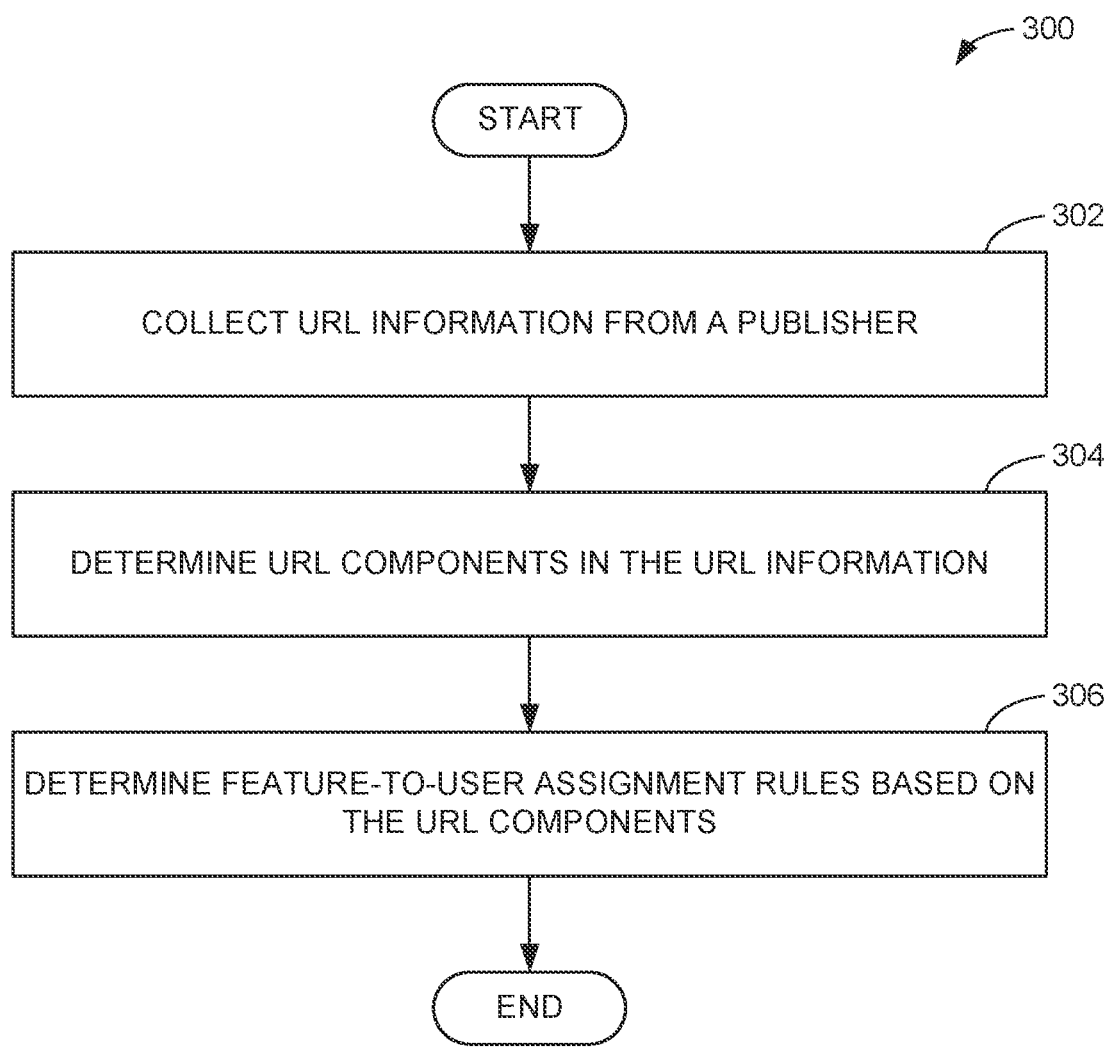
FIG. 3 is a flowchart representative of example machine readable instructions and/or example operations that may be executed by example processor circuitry to implement the AME of FIG. 2 to determine feature-to-user assignment rules.

FIG. 3 is a flowchart representative of example machine readable instructions and/or example operations 300 that may be executed and/or instantiated by processor circuitry to extract information from URLs. The machine readable instructions and/or the operations 300 of FIG. 3 begin at block 302, at which the network interface circuitry 202 (FIG. 2) collects URL information 106 (FIG. 1) from a publisher. For example, the URL information 106 can correspond to media accessed by users via the client devices 102 (FIG. 1). At block 304, the example rule-generating circuitry 124 (FIG. 1) determines URL components in the URL information 106. For example, the rule-generating circuitry 124 can determine URL components based on a quantity of device identifiers associated with the URL components. For example, the quantity of device identifiers represents the number of unique ones of the client devices 102 that accessed webpages or other media represented in the URL information 106. At block 306, the example rule-generating circuitry 124 determines feature-to-user assignment rules based on the URL components. The process of FIG. 3 ends.

Figure 4:
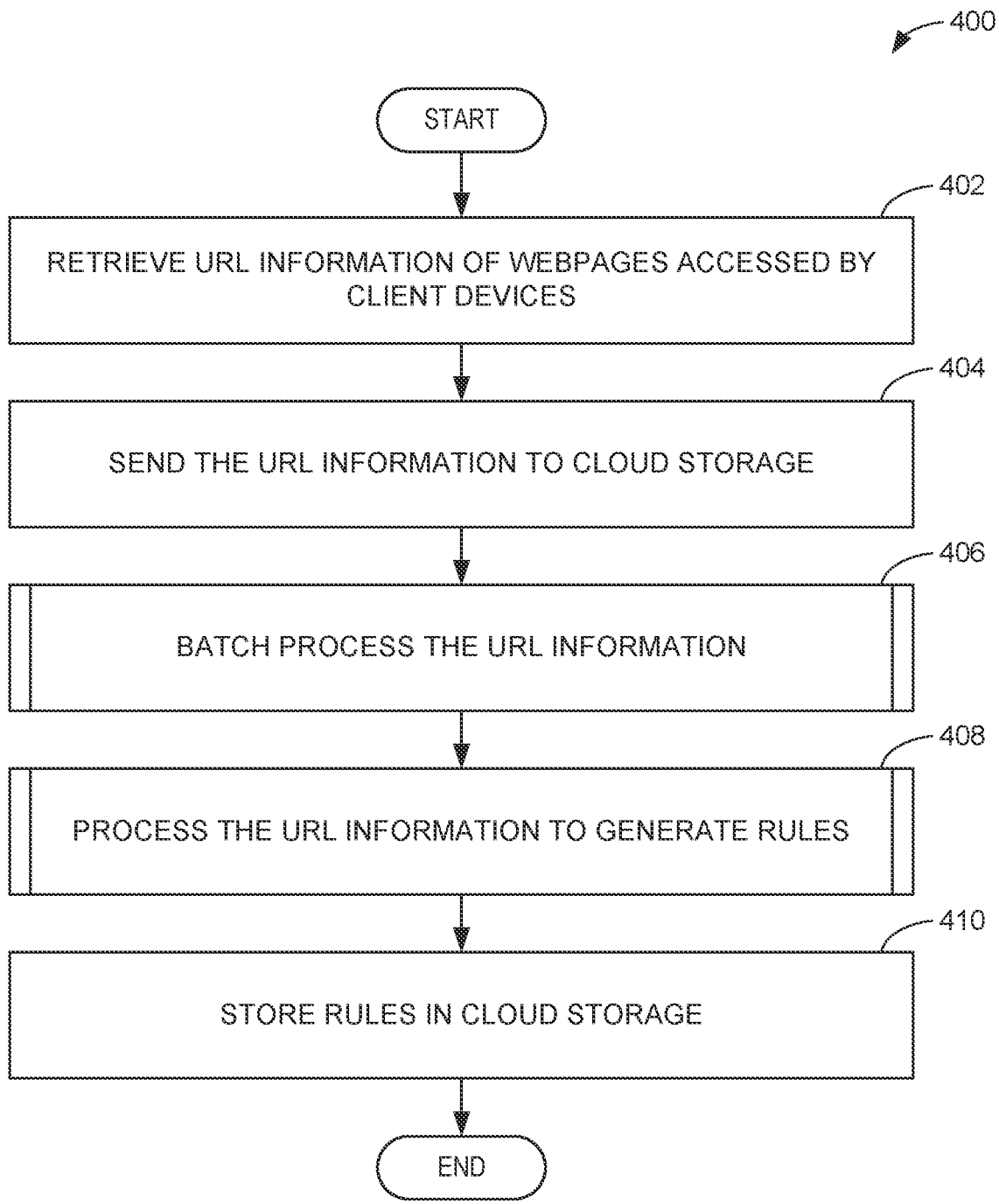
FIG. 4 is another flowchart representative of example machine readable instructions and/or example operations that may be executed by example processor circuitry to implement the AME of FIG. 2 to determine feature-to-user assignment rules.

FIG. 4 is a flowchart representative of example machine readable instructions and/or example operations 400 that may be executed and/or instantiated by processor circuitry to generate feature-to-user assignment rules. The machine readable instructions and/or the operations 400 of FIG. 4 begin at block 402, at which the network interface circuitry 202 (FIG. 2) retrieves URL information 106 (FIG. 1) of webpages accessed by client devices 102 (FIG. 1). For example, as the client devices 102 access participating webpages, instructions in the participating webpages cause the webpage to send monitoring information including the URL information 106 to the network interface circuitry 202. Therefore, as each access to the participating webpages occurs, additional URL information 106 is received by the network interface circuitry 202.

At block 404, the example network interface circuitry 202 sends the URL information 106 to the cloud storage 118 (FIG. 1). For example, the network interface circuitry 202 aggregates the URL information 106 received over a given period of time (e.g., 24 hours, 10 minutes, or any other suitable duration) and loads the URL information 106 in the second cloud storage bucket 130, implemented by the cloud storage 118.

At block 406, the example rule-generating circuitry 124 (FIGS. 1 and 2) batch processes the URL information 106. Example instructions that may be used to implement the batch processing of block 406 are discussed below in connection with FIG. 5. As a result of the operations of block 406, the example rule-generating circuitry 124 stores clean URL information in the cloud storage 118 and metadata of the clean URL information 122 (FIG. 1) in the metadata database 120 (FIG. 1) (e.g., an AWS s3 backed hive table).

At block 408, the example rule-generating circuitry 124 (FIG. 1) processes the URL information to generate the updated feature-to-user assignment rules 126 (FIG. 1). Example instructions that may be used to implement the URL information processing of block 408 are discussed below in connection with FIG. 6.

At block 410, the example interface circuitry 212 (FIG. 2) stores the updated feature-to-user assignment rules 126 in the cloud storage 118. For example, the interface circuitry 212 stores the feature-to-user assignment rules 126 in the cloud storage bucket 128, which is accessible by the scoring circuitry 112 (FIG. 1). The updated feature-to-user assignment rules are saved in the cloud storage bucket 128 as the feature-to-user assignment rules 114 (FIG. 1). The example instructions of FIG. 4 end.

Figure 5:
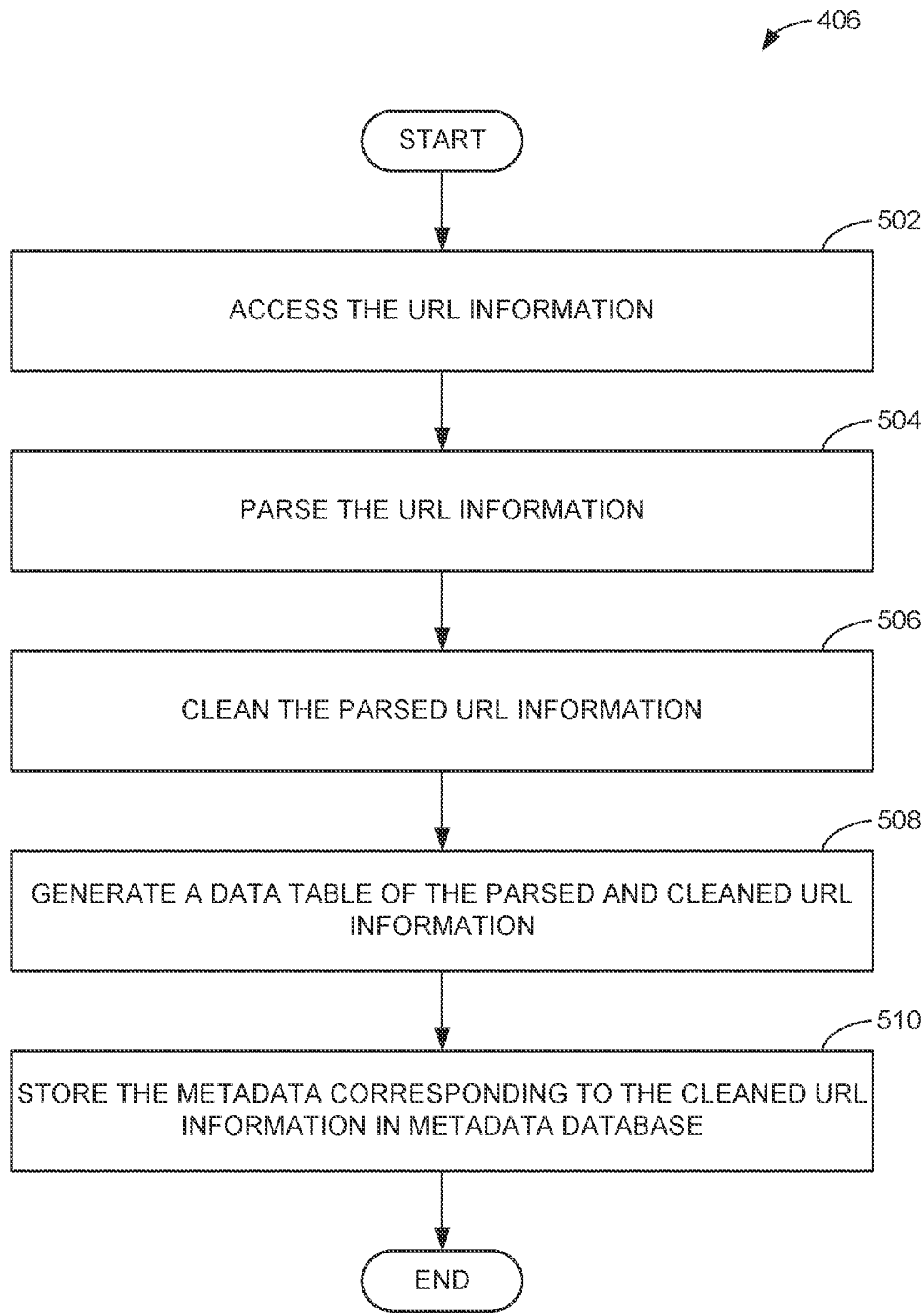
FIG. 5 is a flowchart representative of example machine readable instructions and/or example operations that may be executed by example processor circuitry to implement the rule-generating circuitry of FIG. 2 to batch process URL information.

FIG. 5 is a flowchart representative of example machine readable instructions and/or example operations 406 that may be executed and/or instantiated by processor circuitry to batch process URL information. The machine readable instructions and/or the operations 406 of FIG. 5 begin at block 502, at which the URL information handler circuitry 206 (FIG. 2) accesses the URL information 106 (FIG. 1). For example, the URL information handler circuitry 206 can retrieve the URL information 106 from the cloud storage 118 (FIG. 1) once every 24 hours or at any other interval.

At block 504, the example URL batch processor circuitry 208 (FIG. 2) parses the URL information 106. For example, the URL batch processor circuitry 208 splits the URL information 106 into host URLs and metadata, thus generating parsed URL information.

At block 506, the example URL batch processor circuitry 208 cleans the parsed URL information. For example, the URL batch processor circuitry 208 can remove extra (e.g., unneeded) information from the parsed URL information such as punctuation, special characters, numbers, extra spaces, etc. As a result of the operations of block 506, the example URL batch processor circuitry 208 generates the clean URL information (FIG. 1).

At block 508, the example URL information handler circuitry 206 generates a data table (e.g., an AWS s3 backed hive table) of the clean URL information. For example, the URL information handler circuitry 206 organizes the clean URL information into a data table including columns such as host URL, metadata, processed metadata, publisher, group ID, device ID, etc.

At block 510, the example URL information handler circuitry 206 stores the metadata corresponding to the cleaned URL information in the metadata database 120 (FIG. 1). For example, the URL information handler circuitry 206 can append the data table to an existing URL data table in the cloud storage 118. In some examples, the URL information handler circuitry 206 maps the metadata of the clean URL information in the metadata database 120 to the clean URL information stored in the third cloud storage bucket 132, implemented by the cloud storage 118. In some examples, the metadata database 120 is implemented by a distributed fault-tolerant data warehouse system (e.g., a hive data warehouse). In some examples, such a distributed fault-tolerant data warehouse system uses batch processing and employs a distributed job scheduling framework and a distributed storage solution (e.g., Apache Hadoop storage architecture). The example instructions of FIG. 5 end.

Figure 6:
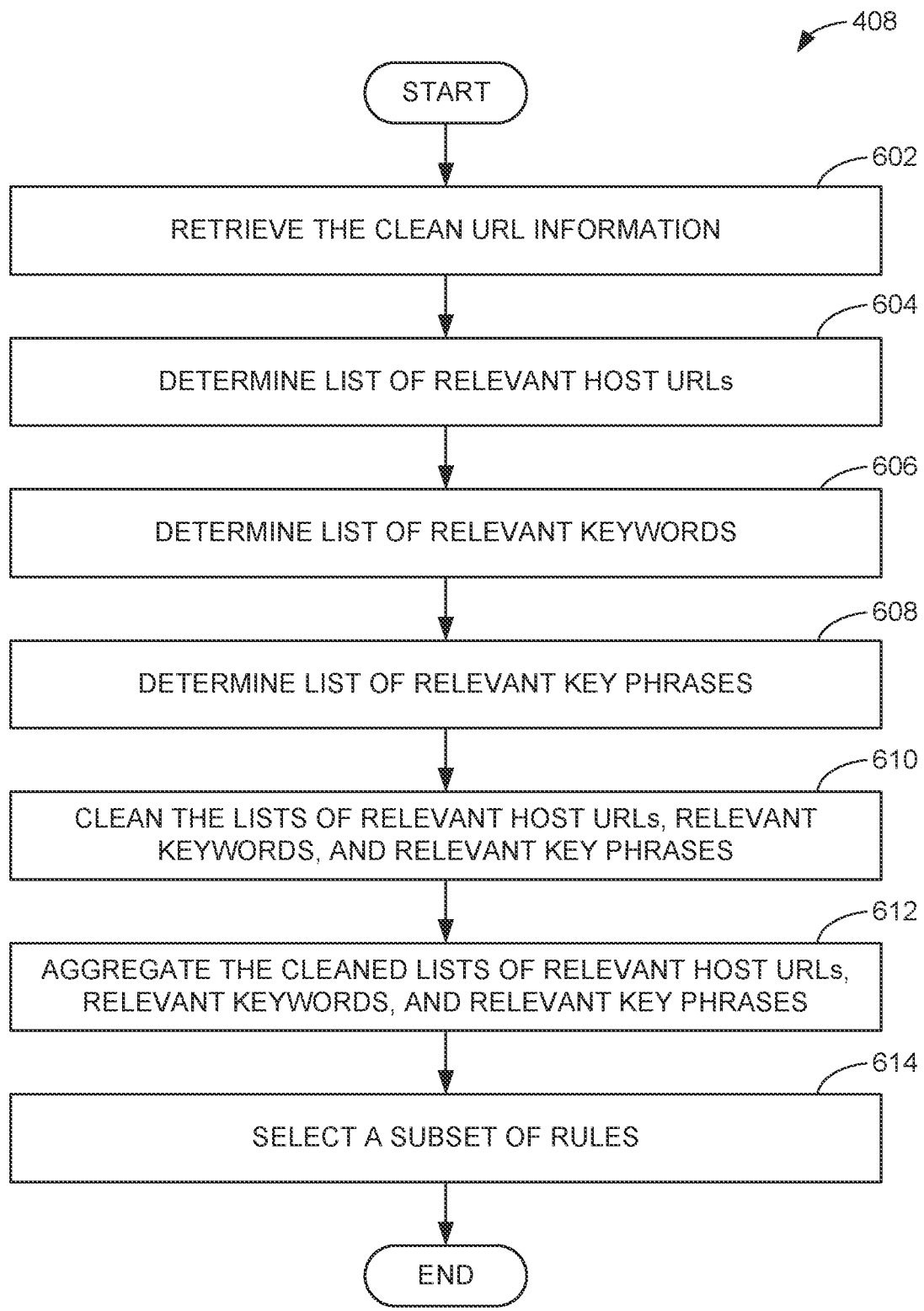
FIG. 6 is a flowchart representative of example machine readable instructions and/or example operations that may be executed by example processor circuitry to implement the rule-generating circuitry of FIG. 2 to process URL information to generate feature-to-user assignment rules.

FIG. 6 is a flowchart representative of example machine readable instructions and/or example operations 408 that may be executed and/or instantiated by processor circuitry to process URL information to generate rules. The machine readable instructions and/or the operations 408 of FIG. 6 begin at block 602, at which the interface circuitry 212 (FIG. 2) retrieves cleaned URL information. For example, the interface circuitry 212 connects to the cloud storage 118 (FIG. 1) and retrieves the clean URL information. In some examples, the interface circuitry 212 retrieves the clean URL information periodically (e.g., every three months or at any other interval). In examples, the interface circuitry 212 retrieves the clean URL information in response to a request to generate updated URL tagging rules.

At block 604, the example relevancy determiner circuitry 214 (FIG. 2) determines a list of relevant host URLs. For example, the relevancy determiner circuitry 214 can first sort the host URLs included in the data table of the clean URL information based on a frequency of the host URL appearing in the data table. Further, the relevancy determiner circuitry 214 can sort the host URLs based on a number of device IDs associated with each host URL. In some examples, the relevancy determiner circuitry 214 can determine the list of relevant host URLs based on the frequencies of the host URLs. In some examples, the relevancy determiner circuitry 214 can determine the list of relevant host URLs based on the number of device IDs associated with each host URL. In other examples, the relevancy determiner circuitry 214 can determine the list of relevant host URLs based on a combination of the frequencies of the host URLs and the number of device IDs associated with each host URL. For example, the relevancy determiner circuitry 214 can select a set number of host URLs having the highest frequencies and associated with the most number of device IDs from the sorted list of host URLs. In other examples, the relevancy determiner circuitry 214 selects each of the host URLs having a frequency over a threshold (e.g., occurring at least 1,000 times or at any other number of times sufficient to confirm relevancy of the host URL) and associated with a number of device IDs above a certain threshold (e.g., 800 device IDs or any other number of device IDs sufficient to confirm relevancy of the host URL).

At block 606, the example relevancy determiner circuitry 214 determines a list of relevant keywords. For example, the relevancy determiner circuitry 214 can first sort the keywords included in the data table of the clean URL information based on a frequency of the keyword appearing in the data table. Further, the relevancy determiner circuitry 214 can sort the keywords based on a number of device IDs associated with each keyword. In some examples, the relevancy determiner circuitry 214 can determine the list of relevant keywords based on the frequencies of the keywords. In some examples, the relevancy determiner circuitry 214 can determine the list of relevant keywords based on the number of device IDs associated with each keyword. In other examples, the relevancy determiner circuitry 214 can determine the list of relevant keywords based on a combination of the frequencies of the keywords and the number of device IDs associated with each keyword. For example, the relevancy determiner circuitry 214 can select a set number of keywords having the highest frequencies and associated with the most number of device IDs from the sorted list of keywords. In other examples, the relevancy determiner circuitry 214 selects each of the keywords having a frequency over a threshold (e.g., occurring at least 1,000 times or at any other number of times sufficient to confirm relevancy of the host URL) and associated with a number of device IDs above a certain threshold (e.g., 800 device IDs or any other number of device IDs sufficient to confirm relevancy of the host URL).

At block 608, the example relevancy determiner circuitry 214 determines a list of relevant key phrases. For example, the relevancy determiner circuitry 214 can first sort the key phrases included in the data table of the clean URL information based on frequencies of the key phrases appearing in the data table. Further, the relevancy determiner circuitry 214 can sort the key phrases based on a number of device IDs associated with each key phrase. For example, a device ID can be associated with a key phrase based on the key phrase appearing in URL information associated with the device ID. The number of devices IDs associated with each key phrase represents the unique ones of the client devices 102 that accessed webpages or other media having URL information including the key phrase. In some examples, the relevancy determiner circuitry 214 can determine the list of relevant key phrases based on the frequencies of the key phrases. In some examples, the relevancy determiner circuitry 214 can determine the list of relevant key phrases based on the number of device IDs associated with each key phrase. In other examples, the relevancy determiner circuitry 214 can determine the list of relevant key phrases based on a combination of the frequencies of the key phrases and the number of device IDs associated with each key phrase. For example, the relevancy determiner circuitry 214 can select a set number of key phrases having the highest frequencies and associated with the most number of device IDs from the sorted list of key phrases. In other examples, the relevancy determiner circuitry 214 selects each of the key phrases having a frequency over a threshold (e.g., occurring at least 1,000 times or at any other number of times sufficient to confirm relevancy of the host URL) and associated with a number of device IDs above a certain threshold (e.g., 800 device IDs or any other number of device IDs sufficient to confirm relevancy of the host URL).

At block 610, the example rule handler circuitry 216 (FIG. 2) cleans the lists of relevant host URLs, keywords, and/or key phrases. For example, the rule handler circuitry 216 cleans the lists by removing undesired or restricted words (e.g., words not included in an English dictionary, stop words (e.g., words commonly avoided by search engines such as "the"), etc.) from the lists.

At block 612, the example rule handler circuitry 216 aggregates the cleaned lists of relevant host URLs, keywords, and/or key phrases. For example, the rule handler circuitry 216 combines the cleaned lists of relevant keywords, relevant host URLs, and/or relevant key phrases to generate a single, initial rule list.

At block 614, the example rule handler circuitry 216 selects a subset of the rules. For example, the rule handler circuitry 216 selects a portion of the rules (e.g., the updated assignment rules 126 of FIG. 1) from the initial rule list such that a number of the rules in the selected portion of rules is less than a limit for a number of rules accepted by the scoring circuitry 112 (FIG. 1). In some examples, the rule handler circuitry 216 selects a subset corresponding to the most relevant rules. In other examples, the rule handler circuitry 216 selects the subset randomly. The example instructions of FIG. 6 end.

Figure 7:
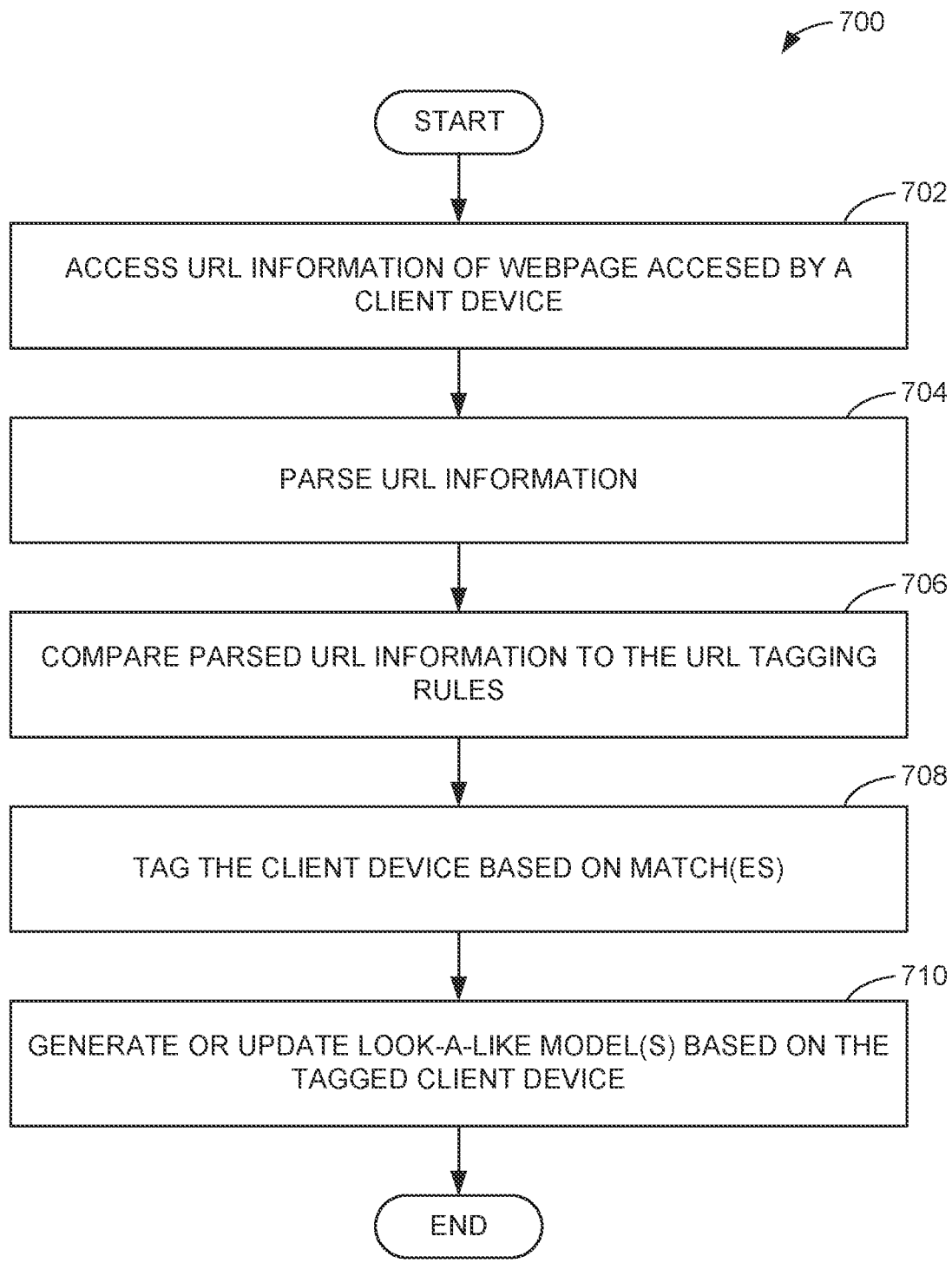
FIG. 7 is a flowchart representative of example machine readable instructions and/or example operations that may be executed by example processor circuitry to implement the user-tagging circuitry of FIG. 2 to assign features to users.

FIG. 7 is a flowchart representative of example machine readable instructions and/or example operations 700 that may be executed and/or instantiated by processor circuitry to tag users based on URL tagging rules. The machine readable instructions and/or the operations 700 of FIG. 7 begin at block 702, at which the network interface circuitry 202 (FIG. 2) accesses the URL information 106 (FIG. 1) of a webpage accessed by a client device 102 (FIG. 1). For example, as the client device 102 accesses a participating webpage, instructions in the participating webpage cause the webpage to send monitoring information including the URL information 106 to the network interface circuitry 202. Therefore, as each access to the participating webpages occurs, URL information 106 is received by the network interface circuitry 202.

At block 704, the example scoring circuitry 112 (FIG. 1) parses the URL information 106. For example, the scoring circuitry 112 can parse the URL information 106 into a host URL, keywords, and/or key phrases. As a result of the operations of block 704, the scoring circuitry 112 generates parsed URL information.

At block 706, the example feature-assigning circuitry 204 (FIG. 2) compares the URL information to the feature-to-user assignment rules 114 (FIG. 1). For example, the feature-assigning circuitry 204 can compare each of the host URL, words, and/or phrases of the URL information 106 to the feature-to-user assignment rules 114. The example feature-assigning circuitry 204 can identify one or more matches of the parsed URL information to the feature-to-user assignment rules 114.

At block 708, the example feature-assigning circuitry 204 tags (e.g., assigns a feature to) the client device 102 based on the one or more matches to the feature-to-user assignment rules 114. For example, if the URL information 106 includes a keyword (e.g., snowboard) that matches a rule within the feature-to-user assignment rules 114, the feature-assigning circuitry 204 assigns a user associated with the client device 102 with a feature based on the rule. In some examples, the parsed URL information has more than one match to the feature-to-user assignment rules 114. In these examples, the user associated with the client device 102 is assigned a feature for each match to the feature-to-user assignment rules 114. In other examples, the parsed URL information has no matches to the feature-to-user assignment rules 114. In these examples, the user associated with the client device 102 is not assigned any features based on the URL information 106. As a result of the operations of block 708, the feature-assigned users 116 (FIG. 1) are updated.

At block 710, the example model generating circuitry 218 generates and/or updates one or more look-a-like models based on the updated feature-assigned users 116. For example, the model generating circuitry 218 can use regression modeling to build a look-a-like model using the updated feature-assigned users 116. The one or more look-a-like models can be used to identify additional users with common interests in order to target media (e.g., advertisements, etc.) to the additional users. The example instructions of FIG. 7 end.

Figure 8:
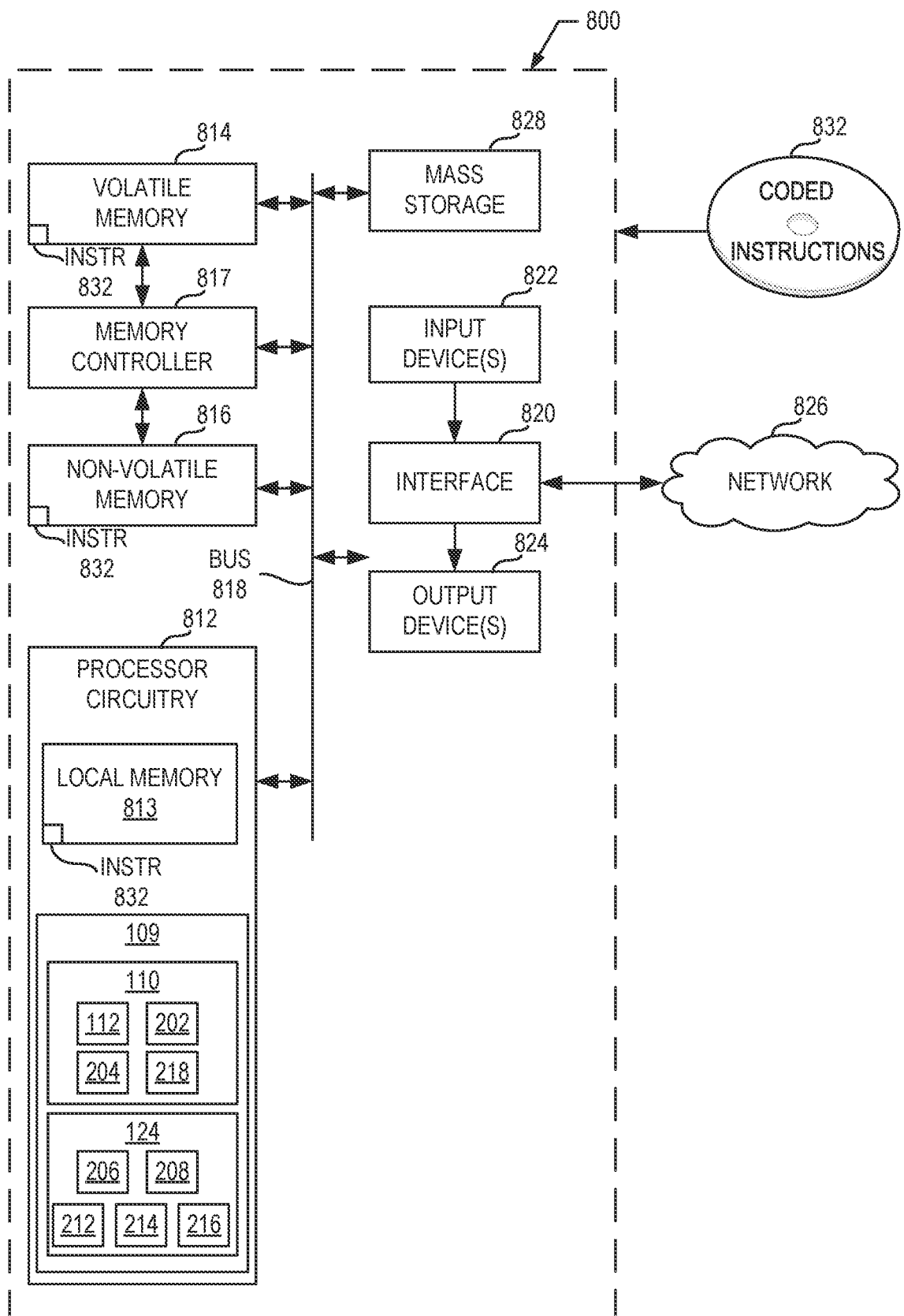
FIG. 8 is a block diagram of an example processing platform including processor circuitry structured to execute the example machine readable instructions and/or the example operations of FIGS. 3-7 to implement the user-tagging circuitry of FIG. 2.

FIG. 8 is a block diagram of an example processor platform 800 structured to execute and/or instantiate the machine readable instructions and/or the operations of FIGS. 3-7 to implement the AME 104 of FIG. 2. The processor platform 800 can be, for example, a server, a personal computer, a workstation, a self-learning machine (e.g., a neural network), or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the AME 104, the user-tagging circuitry 110, the scoring circuitry 112, the rule-generating circuitry 124, the network interface circuitry 202, the feature-assigning circuitry 204, the URL information handler circuitry 206, the URL batch processor circuitry 208, the interface circuitry 212, the relevancy determiner circuitry 214, the rule handler circuitry 216, and the model generating circuitry 218.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 832, which may be implemented by the machine readable instructions of FIGS. 3-7, may be stored in the mass storage device 828, in the volatile memory 814, in the non-volatile memory 816, and/or on a removable non-transitory computer readable storage medium such as a CD or DVD.

Figure 9:
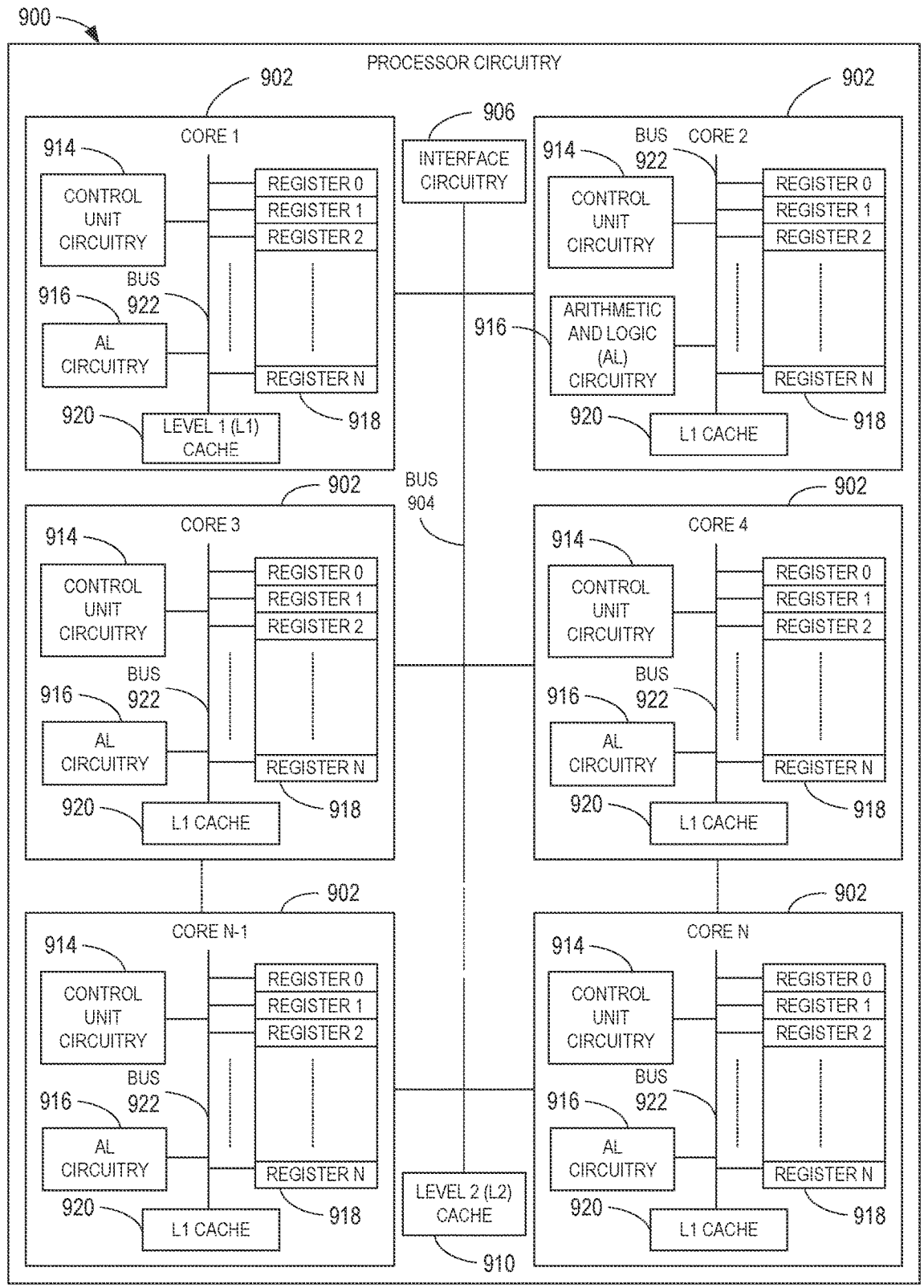
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general purpose microprocessor (e.g., general purpose microprocessor circuitry). The microprocessor 900 executes some or all of the machine readable instructions of the flowcharts of FIGS. 3-7 to effectively instantiate the circuitry of FIG. 2 as logic circuits to perform the operations corresponding to those machine readable instructions. In some such examples, the circuitry of FIG. 2 is instantiated by the hardware circuits of the microprocessor 900 in combination with the instructions. For example, the microprocessor 900 may be implemented by multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine readable instructions and/or operations represented by the flowcharts of FIGS. 3-7.

The cores 902 may communicate by a first example bus 904. In some examples, the first bus 904 may be implemented by a communication bus to effectuate communication associated with one(s) of the cores 902. For example, the first bus 904 may be implemented by at least one of an Inter-Integrated Circuit (I2C) bus, a Serial Peripheral Interface (SPI) bus, a PCI bus, or a PCIe bus. Additionally or alternatively, the first bus 904 may be implemented by any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2 cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry (sometimes referred to as an ALU) 916, a plurality of registers 918, the local memory 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer based operations. In other examples, the AL circuitry 916 also performs floating point operations. In yet other examples, the AL circuitry 916 may include first AL circuitry that performs integer based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general purpose register(s), flag register(s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may be implemented by at least one of an I2C bus, a SPI bus, a PCI bus, or a PCIe bus Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
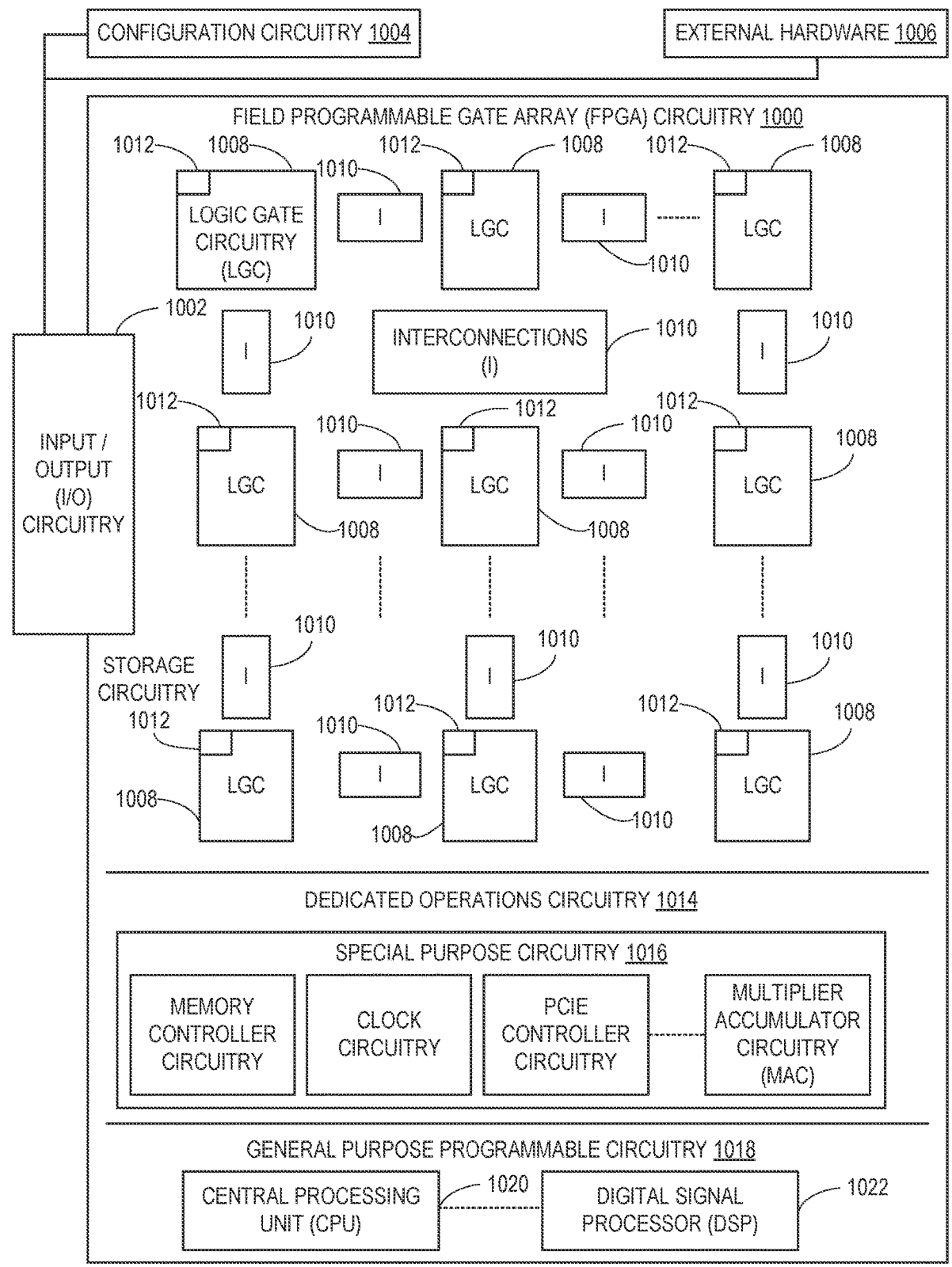
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine readable instructions. However, once configured, the FPGA circuitry 1000 instantiates the machine readable instructions in hardware and, thus, can often execute the operations faster than they could be performed by a general purpose microprocessor executing the corresponding software.

More specifically, in contrast to the microprocessor 900 of FIG. 9 described above (which is a general purpose device that may be programmed to execute some or all of the machine readable instructions represented by the flowcharts of FIGS. 3-7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine readable instructions represented by the flowcharts of FIGS. 3-7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 3-7. As such, the FPGA circuitry 1000 may be structured to effectively instantiate some or all of the machine readable instructions of the flowcharts of FIGS. 3-7 as dedicated logic circuits to perform the operations corresponding to those software instructions in a dedicated manner analogous to an ASIC. Therefore, the FPGA circuitry 1000 may perform the operations corresponding to the some or all of the machine readable instructions of FIGS. 3-7 faster than the general purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine readable instructions to configure the FPGA circuitry 1000, or portion(s) thereof. In some such examples, the configuration circuitry 1004 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and the configurable interconnections 1010 are configurable to instantiate one or more operations that may correspond to at least some of the machine readable instructions of FIGS. 3-7 and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general purpose programmable circuitry 1018 such as an example CPU 1020 and/or an example DSP 1022. Other general purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine readable instructions represented by the flowcharts of FIGS. 3-7 may be executed by one or more of the cores 902 of FIG. 9, a second portion of the machine readable instructions represented by the flowcharts of FIGS. 3-7 may be executed by the FPGA circuitry 1000 of FIG. 10, and/or a third portion of the machine readable instructions represented by the flowcharts of FIGS. 3-7 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
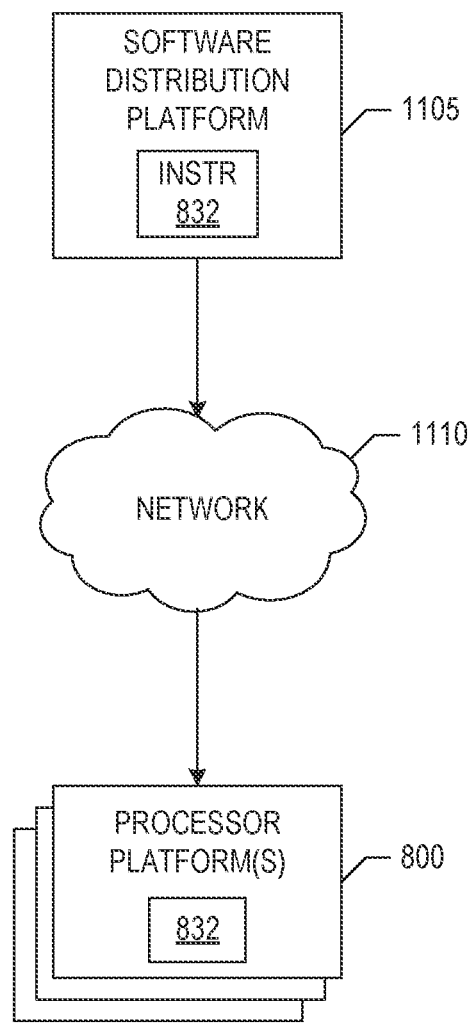
FIG. 11 is a block diagram of an example software distribution platform (e.g., one or more servers) to distribute software (e.g., software corresponding to the example machine readable instructions of FIGS. 3-7) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine readable instructions 832, which may correspond to the example machine readable instructions 300, 400, 406, 408, 700 of FIGS. 3-7, as described above. The one or more servers of the example software distribution platform 1105 are in communication with an example network 1110, which may correspond to any one or more of the Internet and/or any of the example networks 108 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 832 from the software distribution platform 1105. For example, the software, which may correspond to the example machine readable instructions 300, 400, 406, 408, 700 of FIGS. 3-7, may be downloaded to the example processor platform 800, which is to execute the machine readable instructions 832 to implement the AME 104. In some examples, one or more servers of the software distribution platform 1105 periodically offer, transmit, and/or force updates to the software (e.g., the example machine readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that generate audience metrics data based on feature-to-user assignment rules that identify audience members similar to panelist audience members. Disclosed systems, methods, apparatus, and articles of manufacture improve the efficiency of using a computing device by improving the quality of feature-to-user assignment rules that assign features to users based on URL information. Examples disclosed herein utilize relevancy of URL components based on frequency and device ID frequency to determine the most relevant URL components for setting feature-to-user assignment rules. While it may be advantageous to obtain a high feature-density of feature-assigned users, increasing a number of feature-to-user assignment rules increases computing resources used to assign features to users. Thus, for a set number of rules, feature-density of feature-assigned users can be increased without increasing the use of computing resources using examples disclosed herein for determining the feature-to-user assignment rules. Disclosed systems, methods, apparatus, and articles of manufacture are accordingly directed to one or more improvement(s) in the operation of a machine such as a computer or other electronic and/or mechanical device.

Example methods, apparatus, systems, and articles of manufacture for extracting information from URLs are disclosed herein. Further examples and combinations thereof include the following:

Example 1 includes a system including at least one memory, programmable circuitry, and instructions to cause the programmable circuitry to collect first uniform resource locator (URL) information from a server of an Internet-based media publisher, the first URL information corresponding to first media accessed by first users, determine first URL components in the first URL information, and determine feature-to-user assignment rules based on the first URL components.

Example 2 includes the system of example 1, wherein the programmable circuitry is to execute the instructions to collect second URL information from the Internet-based media publisher, the second URL information corresponding to second media accessed by second users, and assign features to the second users based on the second URL information and the feature-to-user assignment rules.

Example 3 includes the system of example 2, wherein the programmable circuitry is to execute the instructions to generate a look-a-like model based on the features assigned to the second users.

Example 4 includes the system of example 2, wherein the programmable circuitry is to execute the instructions to determine second URL components based on the second URL information, and assign the features to the second users based on a match between at least one of the second URL components and at least one of the feature-to-user assignment rules.

Example 5 includes the system of example 1, wherein the first URL information includes first device identifiers.

Example 6 includes the system of example 5, wherein the programmable circuitry is to execute the instructions to determine the first URL components based on a quantity of the first device identifiers associated with the first URL components.

Example 7 includes the system of example 1, wherein the first URL components include at least one of a host URL, a keyword, or a key phrase.

Example 8 includes the system of example 1, wherein the programmable circuitry is to execute the instructions to collect second URL information from the Internet-based media publisher, the second URL information corresponding to second media accessed by second users, and update the feature-to-user assignment rules based on the second URL information.

Example 9 includes the system of example 1, wherein the programmable circuitry is to store the first URL information in a first cloud storage bucket, and store the feature-to-user assignment rules in a second cloud storage bucket, the first cloud storage bucket different from the second cloud storage bucket.

Example 10 includes At least one non-transitory computer readable storage medium comprising instructions that, when executed, cause at least one processor to at least collect first uniform resource locator (URL) information from a server of an Internet-based media publisher, the first URL information corresponding to first media accessed by first users, determine first URL components in the first URL information, and determine feature-to-user assignment rules based on the first URL components.

Example 11 includes the at least one non-transitory computer readable storage medium of example 10, wherein the instructions are to cause the at least one processor to collect second URL information from the Internet-based media publisher, the second URL information corresponding to second media accessed by second users, and assign features to the second users based on the second URL information and the feature-to-user assignment rules.

Example 12 includes the at least one non-transitory computer readable storage medium of example 11, wherein the instructions are to cause the at least one processor to generate a look-a-like model based on the features assigned to the second users.

Example 13 includes the at least one non-transitory computer readable storage medium of example 11, wherein the instructions are to cause the at least one processor to determine second URL components based on the second URL information, and assign the features to the second users based on a match between at least one of the second URL components and at least one of the feature-to-user assignment rules.

Example 14 includes the at least one non-transitory computer readable storage medium of example 10, wherein the first URL information includes first device identifiers.

Example 15 includes the at least one non-transitory computer readable storage medium of example 14, wherein the instructions are to cause the at least one processor to determine the first URL components based on a quantity of the first device identifiers associated with the first URL components.

Example 16 includes the at least one non-transitory computer readable storage medium of example 10, wherein the first URL components include at least one of a host URL, a keyword, or a key phrase.

Example 17 includes the at least one non-transitory computer readable storage medium of example 10, wherein the instructions are to cause the at least one processor to collect second URL information from the Internet-based media publisher, the second URL information corresponding to second media accessed by second users, and example 18 includes the at least one non-transitory computer readable storage medium of example 10, wherein the instructions are to cause the at least one processor to store the first URL information in a first cloud storage bucket, and store the feature-to-user assignment rules in a second cloud storage bucket, the first cloud storage bucket different from the second cloud storage bucket.

Example 19 includes a method, comprising collecting first uniform resource locator (URL) information from a server of an Internet-based media publisher, the first URL information corresponding to first media accessed by first users, determining first URL components in the first URL information, and determining feature-to-user assignment rules based on the first URL components.

Example 20 includes the method of example 19, further including collecting second URL information from the Internet-based media publisher, the second URL information corresponding to second media accessed by second users, and assigning features to the second users based on the second URL information and the feature-to-user assignment rules.

Example 21 includes the method of example 20, further including generating a look-a-like model based on the features assigned to the second users.

Example 22 includes the method of example 20, further including determining second URL components based on the second URL information, and assigning the features to the second users based on a match between at least one of the second URL components and at least one of the feature-to-user assignment rules.

Example 23 includes the method of example 19, wherein the first URL information includes first device identifiers.

Example 24 includes the method of example 23, further including determining the first URL components based on a quantity of the first device identifiers associated with the first URL components.

Example 25 includes the method of example 19, wherein the first URL components include at least one of a host URL, a keyword, or a key phrase.

Example 26 includes the method of example 19, further including collecting second URL information from the Internet-based media publisher, the second URL information corresponding to second media accessed by second users, and updating the feature-to-user assignment rules based on the second URL information.

Example 27 includes the method of example 19, further including storing the first URL information in a first cloud storage bucket, and storing the feature-to-user assignment rules in a second cloud storage bucket, the first cloud storage bucket different from the second cloud storage bucket.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A system including:
   an audience measurement entity (AME) comprising a data store;
   a cloud computing server implemented by the AME, wherein the cloud computing server comprises a cloud storage including first, second, and third cloud storage buckets each having data tables;
   network interface circuitry to:
      obtain first uniform resource locator (URL) information from client devices accessing webpages that participate in a script, wherein the script causes a respective web browser of the client devices to report monitoring information including the first URL information to the cloud computing server, the first URL information being unstructured data and corresponding to first media accessed by first users;
      transmit the first URL information to the cloud computing server;
      store the first URL information as the unstructured data in the second cloud storage bucket of the cloud storage;
   at least one memory;
   programmable circuitry; and
   instructions, stored in the at least one memory, to cause the programmable circuitry to:
      parse the first URL information from the second cloud storage bucket into metadata, the metadata to represent the first URL information as cleaned URL information;
      store the metadata representing the cleaned URL information in the data store of the AME;
      map, in the third cloud storage bucket of the cloud storage, the metadata in the data store of the AME to the first URL information in the second cloud storage bucket;
      determine host URLs in the cleaned URL information;
      determine feature-to-user assignment rules based on at least one of the metadata or the host URLs; and
      store the feature-to-user assignment rules in the first cloud storage bucket of the cloud storage;
   wherein the network interface circuitry is further to:
      collect second URL information from second client devices, the second URL information corresponding to second media accessed by second users;
   the instructions to cause the programmable circuitry further to:
      update the feature-to-user assignment rules based on the second URL information comprising assigning features to the second users based on the second URL information and the feature-to-user assignment rules; and
   second interface circuitry to:
      transmit the updated feature-to-user assignment rules to the cloud computing server to store the updated feature-to-user assignment rules in the first cloud storage bucket of the cloud storage.

2. The system of claim 1, wherein the programmable circuitry is to:
   generate a look-a-like model based on the features assigned to the second users.

3. The system of claim 1, wherein the programmable circuitry is to:
   determine URL components based on the second URL information; and
   assign the features to the second users based on a match between at least one of the URL components and at least one of the feature-to-user assignment rules.

4. The system of claim 1, wherein the first URL information includes first device identifiers.

5. The system of claim 4, wherein the programmable circuitry is to:
   determine the host URLs based on a quantity of the first device identifiers associated with the host URLs.

6. The system of claim 1, wherein the programmable circuitry is to:
   determine a keyword or a key phrase in the first URL information.

7. At least one non-transitory computer readable storage medium comprising instructions that to cause programmable circuitry to at least:
   obtain first uniform resource locator (URL) information from client devices accessing webpages that participate in a script, wherein the script causes a respective web browser of the client devices to report monitoring information including the first URL information to a cloud computing server implemented by an audience measurement entity (AME), the first URL information being unstructured data and corresponding to first media accessed by first users;
   transmit the first URL information to the cloud computing server;
   store the first URL information as the unstructured data in a second cloud storage bucket of cloud storage including a first cloud storage bucket, the second cloud storage bucket, and a third cloud storage bucket, each respective storage bucket having data tables, wherein the cloud storage resides on the cloud computing server;
   parse the first URL information from the second cloud storage bucket into metadata, the metadata to represent the first URL information as cleaned URL information;
   store the metadata representing the cleaned URL information in a data store of the AME, the data store different than the cloud storage;
   map, in the third cloud storage bucket of the cloud storage, the metadata in the data store of the AME to the first URL information in the second cloud storage bucket;
   determine host URLs in the cleaned URL information; and
   determine feature-to-user assignment rules based on at least one of the metadata or the host URLs; and
   store the feature-to-user assignment rules in the first cloud storage bucket of the cloud storage;
   wherein the network interface circuitry is further to:
      collect second URL information from second client devices, the second URL information corresponding to second media accessed by second users;
   the instructions to cause the programmable circuitry further to:
      update the feature-to-user assignment rules based on the second URL information comprising assigning features to the second users based on the second URL information and the feature-to-user assignment rules; and
   second interface circuitry to:
      transmit the updated feature-to-user assignment rules to the cloud computing server to store the updated feature-to-user assignment rules in the first cloud storage bucket of the cloud storage.

8. The at least one non-transitory computer readable storage medium of claim 7, wherein the instructions are to cause the programmable circuitry to generate a look-a-like model based on the features assigned to the second users.

9. The at least one non-transitory computer readable storage medium of claim 7, wherein the instructions are to cause programmable circuitry to:
   determine URL components based on the second URL information; and
   assign the features to the second users based on a match between at least one of the URL components and at least one of the feature-to-user assignment rules.

10. The at least one non-transitory computer readable storage medium of claim 7, wherein the first URL information includes first device identifiers.

11. The at least one non-transitory computer readable storage medium of claim 10, wherein the instructions are to cause programmable circuitry to determine the host URLs based on a quantity of the first device identifiers associated with the host URLs.

12. The at least one non-transitory computer readable storage medium of claim 7, wherein the instructions are to cause the programmable circuitry to determine keyword or a key phrase in the first URL information.

13. A method, comprising:
   obtaining, via a network interface, first uniform resource locator (URL) information from client devices accessing webpages that participate in a script, wherein the script causes a respective web browser of the client devices to report monitoring information including the first URL information to a cloud computing server implemented by an audience measurement entity (AME), the first URL information being unstructured data and corresponding to first media accessed by first users;
   transmitting, via the network interface, the first URL information to the cloud computing server;
   storing the first URL information as the unstructured data in a second cloud storage bucket of cloud storage including a first cloud storage bucket, the second cloud storage bucket, and a third cloud storage bucket, each respective storage bucket having data tables, wherein the cloud storage resides on the cloud computing server;
   parsing, by executing an instruction with programmable circuitry, the first URL information from the second cloud storage bucket into metadata, the metadata to represent the first URL information as cleaned URL information;
   storing, by executing an instruction with the programmable circuitry, the metadata representing the cleaned URL information in a data store of the AME, the data store different than the cloud storage;
   mapping, by executing an instruction with the programmable circuitry and in the third cloud storage bucket of the cloud storage, the metadata in the data store of the AME to the first URL information in the second cloud storage bucket;
   determining, by executing an instruction with the programmable circuitry, host URLs in the cleaned URL information;

determining, by executing an instruction with the programmable circuitry, feature-to-user assignment rules based on at least one of the metadata or the host URLs; and storing, by executing an instruction with the programmable circuitry, the feature-to-user assignment rules in the first cloud storage bucket of the cloud storage;

collecting, via the network interface, second URL information from second client devices, the second URL information corresponding to second media accessed by second users;

updating, by executing an instruction with the programmable circuitry, the feature-to-user assignment rules based on the second URL information comprising assigning features to the second users based on the second URL information and the feature-to-user assignment rules; and transmitting, via another network interface, the updated feature-to-user assignment rules to the cloud computing server to store the updated feature-to-user assignment rules in the first cloud storage bucket of the cloud storage.

14. The method of claim 13, further including generating a look-a-like model based on the features assigned to the second users.

15. The method of claim 13, further including:
determining URL components based on the second URL information; and
assigning the features to the second users based on a match between at least one of the URL components and at least one of the feature-to-user assignment rules.

16. The method of claim 13, wherein the first URL information includes first device identifiers.

17. The method of claim 16, further including determining the host URLs based on a quantity of the first device identifiers associated with the host URLs.

18. The method of claim 13, further including determining a keyword or a key phrase in the first URL information.

* * * * *